(12) United States Patent
Carson et al.

(10) Patent No.: US 10,476,883 B2
(45) Date of Patent: Nov. 12, 2019

(54) SIGNALING CONDITIONAL ACCESS SYSTEM SWITCHING AND KEY DERIVATION

(71) Applicant: INSIDE SECURE, Meyreuil OT (FR)

(72) Inventors: Jacob T. Carson, Long Beach, CA (US); Michael A. Gorman, Cypress, CA (US); Ronald P. Cocchi, Seal Beach, CA (US)

(73) Assignee: INSIDE SECURE, Meyreuil (FR)

( * ) Notice: Subject to any disclaimer, the term of this patent is extended or adjusted under 35 U.S.C. 154(b) by 0 days.

(21) Appl. No.: 15/791,260

(22) Filed: Oct. 23, 2017

(65) Prior Publication Data

US 2018/0145988 A1    May 24, 2018

Related U.S. Application Data

(63) Continuation-in-part of application No. 14/382,539, filed as application No. PCT/US2013/028761 on Mar. 1, 2013, now Pat. No. 9,800,405.
(Continued)

(51) Int. Cl.
*H01L 29/06* (2006.01)
*H04L 29/06* (2006.01)
(Continued)

(52) U.S. Cl.
CPC .......... *H04L 63/104* (2013.01); *H04L 9/0822* (2013.01); *H04L 9/0861* (2013.01);
(Continued)

(58) Field of Classification Search
USPC ........ 726/2, 21, 36; 713/150, 163, 171, 181; 380/255, 264, 276
See application file for complete search history.

(56) References Cited

U.S. PATENT DOCUMENTS

| 4,903,262 A | * | 2/1990 | Dissosway ............ H04L 1/0078 370/327 |
| 5,444,686 A |   | 8/1995 | Dunlavy |

(Continued)

FOREIGN PATENT DOCUMENTS

WO    2013-131065    9/2013

OTHER PUBLICATIONS

PCT International Search Report & Written Opinion dated Mar. 29, 2018 for PCT Application No. PCT/IB2018/050124.
(Continued)

*Primary Examiner* — Sharif E Ullah
(74) *Attorney, Agent, or Firm* — Gates & Cooper LLP

(57) ABSTRACT

A method and apparatus for controlling a group of the client devices to switch at least one client device of the group of client devices from a first conditional access system to a second conditional access system is disclosed. In one embodiment, the method comprises generating a group identifier identifying the group of the client devices, transmitting a first client device signaling message having the group identifier only to each client device of the identified group of client devices, the group identifier for storage in each client device of the identified group of client devices in non-volatile memory, and transmitting a second client device signaling message to plurality of client devices, the second client device message comprising the group identifier and signaling a switch of each of the identified group of client devices from the first conditional access system to the second conditional access system.

21 Claims, 17 Drawing Sheets

Related U.S. Application Data

(60) Provisional application No. 62/446,196, filed on Jan. 13, 2017, provisional application No. 61/606,260, filed on Mar. 2, 2012.

(51) Int. Cl.
    *H04L 9/32* (2006.01)
    *H04L 9/08* (2006.01)
    *H04N 21/2389* (2011.01)
    *H04N 21/4385* (2011.01)
    *H04N 21/4623* (2011.01)
    *H04N 21/4627* (2011.01)
    *H04N 21/44* (2011.01)

(52) U.S. Cl.
    CPC .......... *H04L 9/3247* (2013.01); *H04L 9/3297* (2013.01); *H04L 63/062* (2013.01); *H04L 63/068* (2013.01); *H04N 21/23895* (2013.01); *H04N 21/43853* (2013.01); *H04N 21/4623* (2013.01); *H04N 21/44* (2013.01); *H04N 21/4627* (2013.01)

(56) References Cited

U.S. PATENT DOCUMENTS

| | | | |
|---|---|---|---|
| 5,809,281 A * | 9/1998 | Steele | H03K 19/1736 326/39 |
| 5,940,504 A * | 8/1999 | Griswold | G06F 11/3419 705/59 |
| 6,574,609 B1 | 6/2003 | Downs et al. | |
| 7,010,607 B1 * | 3/2006 | Bunton | H04L 1/18 709/228 |
| 7,461,249 B1 | 12/2008 | Pearson et al. | |
| 7,539,875 B1 | 5/2009 | Manferdelli et al. | |
| 7,698,718 B2 | 4/2010 | Dellow et al. | |
| 7,707,405 B1 | 4/2010 | Gilman et al. | |
| 7,801,308 B1 | 9/2010 | Hang | |
| 8,122,246 B2 | 2/2012 | Matsushita | |
| 8,417,965 B1 | 4/2013 | Sundararajan et al. | |
| 9,032,501 B1 | 5/2015 | Martin et al. | |
| 9,532,097 B1 * | 12/2016 | Chen | H04N 21/43615 |
| 2002/0007456 A1 | 1/2002 | Peinado et al. | |
| 2002/0026531 A1 | 2/2002 | Keane | |
| 2003/0159140 A1 | 8/2003 | Candelore | |
| 2003/0194086 A1 | 10/2003 | Lambert | |
| 2004/0064351 A1 | 4/2004 | Mikurak | |
| 2004/0166942 A1 | 8/2004 | Muir | |
| 2005/0093572 A1 * | 5/2005 | Sun | G06F 9/4403 326/38 |
| 2006/0048132 A1 | 3/2006 | Chen et al. | |
| 2006/0129502 A1 | 6/2006 | Pastusiak et al. | |
| 2006/0155990 A1 | 7/2006 | Katsube et al. | |
| 2007/0180464 A1 | 8/2007 | Dellow et al. | |
| 2007/0180496 A1 | 8/2007 | Fransdonk | |
| 2008/0003980 A1 | 1/2008 | Voss et al. | |
| 2008/0005577 A1 | 1/2008 | Rager et al. | |
| 2008/0095365 A1 | 4/2008 | Cocchi et al. | |
| 2008/0189549 A1 | 8/2008 | Hughes | |
| 2008/0306874 A1 | 12/2008 | White | |
| 2009/0063756 A1 | 3/2009 | Asipov | |
| 2009/0157552 A1 | 6/2009 | Schnell et al. | |
| 2009/0193507 A1 | 7/2009 | Ibrahim | |
| 2009/0208004 A1 | 8/2009 | Kawai et al. | |
| 2009/0210348 A1 | 8/2009 | Klein | |
| 2009/0307780 A1 | 12/2009 | Dubhashi et al. | |
| 2009/0323971 A1 | 12/2009 | Munguia et al. | |
| 2009/0326964 A1 | 12/2009 | Garg et al. | |
| 2010/0153731 A1 | 6/2010 | Duc et al. | |
| 2010/0195824 A1 | 8/2010 | Lin et al. | |
| 2010/0217972 A1 | 8/2010 | Lohiniva et al. | |
| 2010/0250955 A1 | 9/2010 | Trevithick et al. | |
| 2010/0274972 A1 * | 10/2010 | Babayan | G06F 9/3842 711/125 |
| 2010/0301903 A1 * | 12/2010 | Cocchi | H03K 19/20 326/122 |
| 2011/0004945 A1 | 1/2011 | Kurokawa | |
| 2011/0010779 A1 | 1/2011 | Nakagawa | |
| 2011/0055585 A1 | 3/2011 | Lee | |
| 2011/0138472 A1 | 6/2011 | Nikitin et al. | |
| 2011/0213976 A1 | 9/2011 | Ryou et al. | |
| 2012/0042168 A1 | 2/2012 | Yuan et al. | |
| 2012/0042170 A1 | 2/2012 | Curtin et al. | |
| 2012/0054841 A1 | 3/2012 | Schultz et al. | |
| 2012/0131349 A1 | 5/2012 | Layson et al. | |
| 2012/0131681 A1 | 5/2012 | Layson et al. | |
| 2012/0264427 A1 | 10/2012 | Adatia et al. | |
| 2012/0292390 A1 | 11/2012 | Yu et al. | |
| 2013/0061291 A1 | 3/2013 | Hegg et al. | |
| 2013/0111522 A1 * | 5/2013 | Tatem | H04N 21/2143 725/39 |
| 2013/0145173 A1 | 6/2013 | Shablygin et al. | |
| 2015/0113278 A1 | 4/2015 | Cocchi et al. | |
| 2017/0012952 A1 * | 1/2017 | Cocchi | H04L 63/061 |

OTHER PUBLICATIONS

Non-Final Office Action dated Feb. 6, 2019 for U.S. Appl. No. 16/056,268.
Non-Final Office Action dated Nov. 1, 2018 for U.S. Appl. No. 15/675,418.
International Search Report and Written Opinion dated May 23, 2013 for PCT Application No. PCT/US2013/028761.
Partial Supplementary European Search Report dated Oct. 28, 2015 for EP Application No. 13755054.7.
Rosenblatt, B., "The New Technologies for Pay TV Content Security", Dec. 5, 2011, pp. 1-28, XP002689399, http://irdeto.com/documents/New_Technologies_for_Pay_TV_Content_Security.pdf.
Extended European Search Report dated Feb. 16, 2016 for EP Application No. 13755054.7.

* cited by examiner

SIGNALING CONDITIONAL ACCESS SYSTEM SWITCHING AND KEY DERIVATION

CROSS-REFERENCE TO RELATED APPLICATIONS

This application claims benefit of U.S. Provisional Patent Application Ser. No. 62/446,196, entitled "SIGNALING METHOD FOR CAS SWITCHING AND KFY DERIVATION," by Jacob T. Carson, Michael A. Gorman, and Ronald P. Cocchi, filed Jan. 13, 2017, which application is hereby incorporated by reference herein.

This application is also a continuation-in-part of U.S. Patent Application Ser. No. 14/382,539, entitled "BLACKBOX SECURITY PROVIDER PROGRAMMING SYSTEM PERMITTING MULTIPLE CUSTOMER USE AND IN FIELD CONDITIONAL ACCESS SWITCHING," by Ronald P. Cocchi et al., filed Sep. 2, 2014, which application is a National Stage Entry of international patent application PCT/US13/28761, entitled "BLACKBOX SECURITY PROVIDER PROGRAMMING SYSTEM PERMITTING MULTIPLE CUSTOMER USE AND IN FIELD CONDITIONAL ACCESS SWITCHING," by Ronald P. Cocchi et al., filed Mar. 1, 2013, which application claims benefit of U.S. Provisional Patent Application Ser. No. 61/606,260, entitled "BLACKBOX SECURITY PROVIDER PROGRAMMING SYSTEM PERMITTING MULTIPLE CUSTOMER USE AND FIELD CONDITIONAL ACCESS SWITCHING," by Ronald P. Cocchi et al., filed Mar. 2, 2012, all of which applications are hereby incorporated by reference herein.

This application is also related to U.S. patent application Ser. No. 15/652,082, entitled "METHOD AND APPARATUS FOR SUPPORTING MULTIPLE BROADCASTERS INDEPENDENTLY USING A SINGLE CONDITIONAL ACCESS SYSTEM," by Ronald P. Cocchi et al., filed Jul. 17, 2017, which also claims benefit of U.S. Provisional Patent Application Ser. No. 62/446,196, entitled "SIGNALING METHOD FOR CAS SWITCHING AND KFY DERIVATION," by Jacob T. Carson, Michael A. Gorman, and Ronald P. Cocchi, filed Jan. 13, 2017, which application is hereby incorporated by reference herein.

BACKGROUND OF THE INVENTION

1. Field of the Invention

The present invention relates to systems and methods for securely providing media programs and other information to subscribers via a black box Security Provider Programming system, and in particular to a system and method for securely providing data for use by a hardware device of a receiver for conditional access.

2. Description of the Related Art

The provision of information such as media programs to remote consumers is well known in the art. Such provision may be accomplished via terrestrial or satellite broadcast, cable, closed circuit, or Internet transmission to consumer electronics (CE) devices at the consumer's home or office.

A common problem associated with such transmission is assuring that the reception of such information is limited to authorized end-users. This problem can be solved via the use of encryption and decryption operations performed by devices with appropriate security functionality. For example, it is well known to encrypt media programs before transmission to CE devices with electronics and processing that permits the encrypted media programs to be decrypted and presented to only authorized users.

To implement this functionality, the CE products typically include keys, software, and other data. Since such data is of value to unauthorized users as well, CE companies need a way to protect this valuable information.

Typically, this has required the production of CE devices with special integrated circuits (or chips) with security features enabled and information needed to perform the security functions loaded into chip memory. Such chips can include System on Chips (SOC), which comprise the primary Central Processing Unit (CPU) of the CE device (which may also include secondary processors, security processors, custom Application Specific Integrated Circuits (ASICSs), etc.) or other chip devices that perform the processing of commands within a CE device. Conditional Access providers provide content protection schemes to secure broadcast content is paid for when viewed by subscribers. Problems arise when the content protect schemes are either compromised or implemented in a man which security holes or flaws can be exploited by attacker. The cost to design, manufacturer and distribute these CE devices is extremely expensive. Significant savings can be achieved if a service provider or broadcaster can re-purpose existing CE devices by replacing the conditional access (CA)system used with CE devices that are in the field (distributed to or in use by customers). As an alternative to switching CA systems, the CE device can be provisioned to support separate and cryptographically isolate CA systems during manufacture. This permits the security provided by another CA vendor 108B to be used in the event the security provided by another one of the CA vendors 108B and co-existing on the chip 114, is compromised.

What is needed is a system and method for providing a security infrastructure that permits the programming of unique security functions in standardized chip designs and enables switching among different and existing CA systems deployed in CE devices. The present invention satisfies that need.

SUMMARY OF THE INVENTION

To address the requirements described above, the present invention discloses a method of controlling a group of the client devices to switch at least one client device of the group of client devices from a first conditional access system to a second conditional access system via a plurality of client device signaling messages, each comprising at least one of a plurality of action codes and payload data. In one embodiment, the method, which can be applied to a system of a plurality of client devices for receiving media programs from a service providers, comprises generating a group identifier identifying the group of the client devices, transmitting a first client device signaling message having the group identifier only to each client device of the identified group of client devices, the group identifier for storage in each client device of the identified group of client devices in non-volatile memory, and transmitting a second client device signaling message to plurality of client devices, the second client device message comprising the group identifier and signaling a switch of each of the identified group of client devices from the first conditional access system to the second conditional access system.

Hence, disclosed herein is a system and method that service provider 102 or broadcaster to utilize high security chip device features to enable in-field switching of CA vendors and/or co-existence of CA vendors for fielded CE Devices. This is possible in part, due to a set of base security features that can be integrated into commercially available integrated circuitry for use in CE products, yet customizable for many different applications. Use of black box programmed secure silicon features enables service providers or broadcasters to switch CA vendors or for different CA systems from multiple vendors to co-exist in CE devices by cryptographically isolating key sets allocated to and used by independent CA vendors.

This enables strong and unique encryption of sensitive data (such as HDCP and/or CI+ keys) that can be logically associated with data in individual chip devices, and allows CE device manufacturers to prevent unauthorized code being run on the CE devices and protects provisioned data from both independent partners (i.e. CA providers) and attackers. Importantly, techniques and systems described herein also allow chip device manufacturers to design and build chips that can be used by any one of a plurality of customers, service provider, or CA vendors.

The system described herein also permits programming of unique secrets into the chip device at the chip manufacturing site and permits later allocation of these chip devices to any one of a number of potential CE device manufacturers and/or CA vendors. Chip device programming can also occur at the packaging or product manufacturing facility by execution of an in-field programming sequence on the chip device.

A method for unlocking a hardware device is also disclosed. In one embodiment, the method comprises the steps of transmitting a product provisioning key (PPK) encrypted according to a secret value (SV) ($E_{SV}$[PPK]) from a first entity to a second entity for secure storage in a hardware device; receiving a customer validation code (CVC) from the second entity, the (CVC) computed in the hardware device from the encrypted product provisioning key $E_{SV}$[PPK]; receiving an unlock request comprising the customer validation code (CVC) and a hardware unique identifier (PID) in the first entity from the second entity; computing an expected customer validation code (CVC) in the first entity from the secret value (SV) and the product provisioning key (PPK); and transmitting data unlocking the hardware device if the expected customer validation code (CVC) computed by the first entity matches the received customer validation code from the second entity.

The keys and programming infrastructure summarized above as provided by an independent security provider enables fielded CE devices to change conditional access vendors giving the service provider or broadcaster more flexibility in managing their business. Enabling the ability to change conditional access vendors in fielded CE devices can result in saving the service provider a significant capital investment. The savings are realized by using the provided vendor independent security architecture and downloading a new software image containing an alternate conditional access vendor application without having to replace fielded CE devices.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

This disclosure describes a system and method that allows third parties to provide set top boxes with advanced security features that (1) allow the signing of a customer's public key, (2) allow programming of chips with secret keys at chip manufacturing facility and (3) provide service providers a method to independently allocate those secret keys to security vendors when the CE device is in the field.

Architectural Entities

Figure 1A:
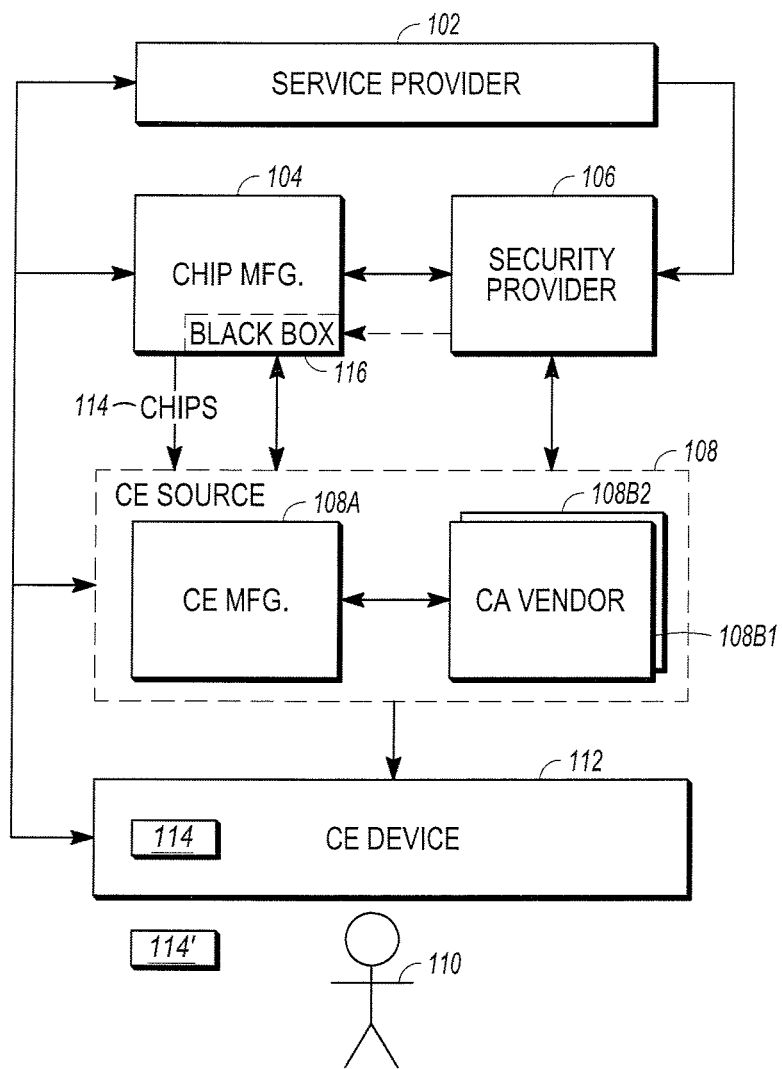
FIG. 1A is a diagram of selected architectural entities described in this disclosure.

FIG. 1A is a diagram of selected architectural entities described in this disclosure. They include a service provider 102, a chip manufacturer 104, a security provider 106, a third party vendor(s) 108 and subscriber(s) 110. The service provider 102 transmits media programs and information to consumer electronics (CE) device(s) 112 that are deployed to subscribers 110. The CE device 112 presents the media programs to the subscribers 110. The CE device 112 can include devices such as set-top boxes (STBs) integrated receiver/decoders (IRDs) portable CE devices such as cellphones or personal data assistants (PDAs), laptop computers, tablet computers, and desktop computers. Any device with the required processing and memory capacity having the proper programming or hardware can be used as a CE device. An exemplary IRD is disclosed in U.S. Pat. No. 6,701,528, which is hereby incorporated by reference herein.

To assure that only authorized subscribers 110 receive the media programs and information, the CE devices 112 perform security functions that are implemented at least in part using hardware processing/memory devices 114 (hereinafter alternatively referred to as chips) that are produced by chip manufacturer 104. For example, the transport module of the IRD disclosed in U.S. Pat. No. 6,701,528, is typically implemented by a chip.

Figure 1B:
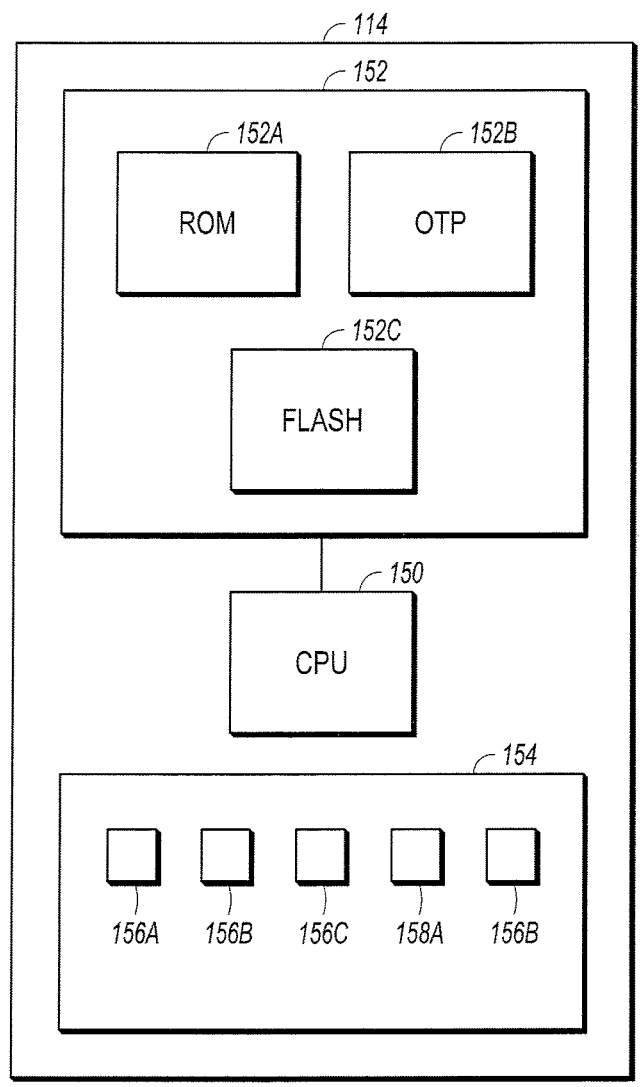
FIG. 1B is a diagram of an exemplary chip.

FIG. 1B is a diagram of an exemplary chip 114. The chip 114 comprises memory 152 communicatively coupled to a processor or CPU 150. The memory 152 stores instructions and/or data such as keys that are used to implement the conditional access functionality of the CE device 112. The memory 152 may include read only memory (ROM) 152A, one-time-programmable memory (OTP) 152B, and flash memory 152C. The chip 114 may also comprise a configuration portion 154, which may include a series of fuses 156A-156C and/or flags 158A-156B. The flags 158 may also be reflected by values in the memory 152. The fuses 156 are irreversibly activated by the chip manufacturer 104 to implement particular chip 114 functionality. For example, activation of fuse 156A may activate a triple data encryption standard (DES) functional capability of the chip 114, while fuse 156B may activate an RSA encryption functionality.

The CE devices 112 are manufactured by a CE source 108. In one embodiment, the CE source 108 is defined to include a particular CE manufacturer 108A that is responsible for the manufacture of a CE device 112 having hardware and software capable of implementing the CA functions allocated to the CE device 112 by a particular CA vendor 108B, which provides the instructions and data (for example, software and keys) that are used by the CE device 112 hardware to implement the CA functions required for the CA system used by the service provider 102. A particular CE source 108 is identified by a particular CE manufacturer's 108A product used with a particular CA system from CA vendor 108B used with the CE device 112. For purposes of the discussion below, when the same CE device 112 is used with the instructions and data (or smart card implementing some or all of the instructions and data) from two different CA vendors 108B, this represents two distinct CA sources 108

In one embodiment, the CE device 112 hardware is capable of performing the CA functions allocated to the CE device 112 for multiple CA vendors 108B at the same time. For example, a first CA vendor 108B1 (CA vendor 1) may define a CA system that allocates a first set of CA functions to the CE device 112, and a second CA vendor 108B2 (CA vendor 2) may define a second CA system that allocates a second set of CA functions at least partially different than the first set of functions to the CE device 112. The CE device 112 may support both CA systems by storing instructions and data that allow the CE device hardware to perform the CA functions allocated to the CE device 112 in both the first CA system and the second CA system. Thus, using the CA functionality provided by both the first CA vendor 108B1 and the second CA vendor 108B2, the fielded CE device 112 may be capable of performing the CA functions needed to receive and decrypt media programs and data transmitted by two different service providers 102 (for example, DIRECTV AND ECHOSTAR).

The CE device 112 hardware may also support the replacement or substitution of one set of allocated CA functions for another set of allocated functions. For example, rather than support both the first set and the second set of allocated CA functions, the CE device 112 hardware may be configured such that a first set of allocated CA functions is automatically disabled when the second set of allocated CA functions are enabled. This would allow, for example, a receiver initially configured to receive media programs from a first service provider 102 to be de-configured from receiving such programs, and to instead receive media programs from a second service provider 102. Or, the first service provider 102 could desire a change its content protection services from its initial CA vendor 108B1 to those provided by a second CA vendor 108B2.

In another embodiment, the CE device source 108 may also include one or more CA vendors 108B that are architectural entities separate from the CE manufacturer 108A. For example, the CE device 112 may employ a smart card 114' (for example, as shown by the access card of FIG. 2 of U.S. Pat. No. 6,701,528) or other removable security device having security functions defined by the CA vendor 108B. The CA vendor 108B may manufacture and provide this security device 114' to the CE manufacturer 108A for ultimate provision to the subscriber(s) 110 with the CE device 112.

The CE source 108 may accept chips 114 from the chip manufacturer 104 and install them into the CE device 112. As described below, the present invention allows the chips 114 to be a standard design, yet uniquely and remotely programmable so as to be useful for CE devices 112 from different CE manufacturers 108A, and that can perform the allocated CA functionality for multiple CA systems enabled by different CA vendors 108B and used by different service providers 102.

In one embodiment, the chips 114 are programmed via use of a black box 116 provided by a third party security provider 106. The black box 116, as the name implies, is a device that performs a transformation of data such as code or keys, without revealing how the transformation is performed or disclosing the data. The use of the black box 116 in this instance, allows the security provider 106 to program instructions and/or data into the chip 114 at the chip manufacturer's facility and under the control of the chip manufacturer 104 without exposing that information and/or data itself to the chip manufacturer 104.

Data from the security provider 106 or the service provider 102 may also be programmed into the chip 114 at the CE source 108 or the subscriber 110 location using the techniques described below.

Customer Product Differentiator Field

A customer product differentiator, somewhat analogous to a customer number, is used by the security provider 106 and/or the chip manufacturer 104 to identify a customer specific configuration of a specific chip 114 for the functions to be performed by the CE Device 112 from a particular CE Source 108. The customer product differentiator (CPD 202) may be assigned to a particular CE Source 108 or service provider 102, for example, PANASONIC, DIRECTV or ECHOSTAR. Further, a single service provider 102 or CE source 108 may have different CPDs for products that are used in different markets if those products require chips that implement different security functions. In one embodiment, the customer product differentiator comprises a bit customer product differentiator (CPD 202) represented by a 32 bit field.

Figure 2:
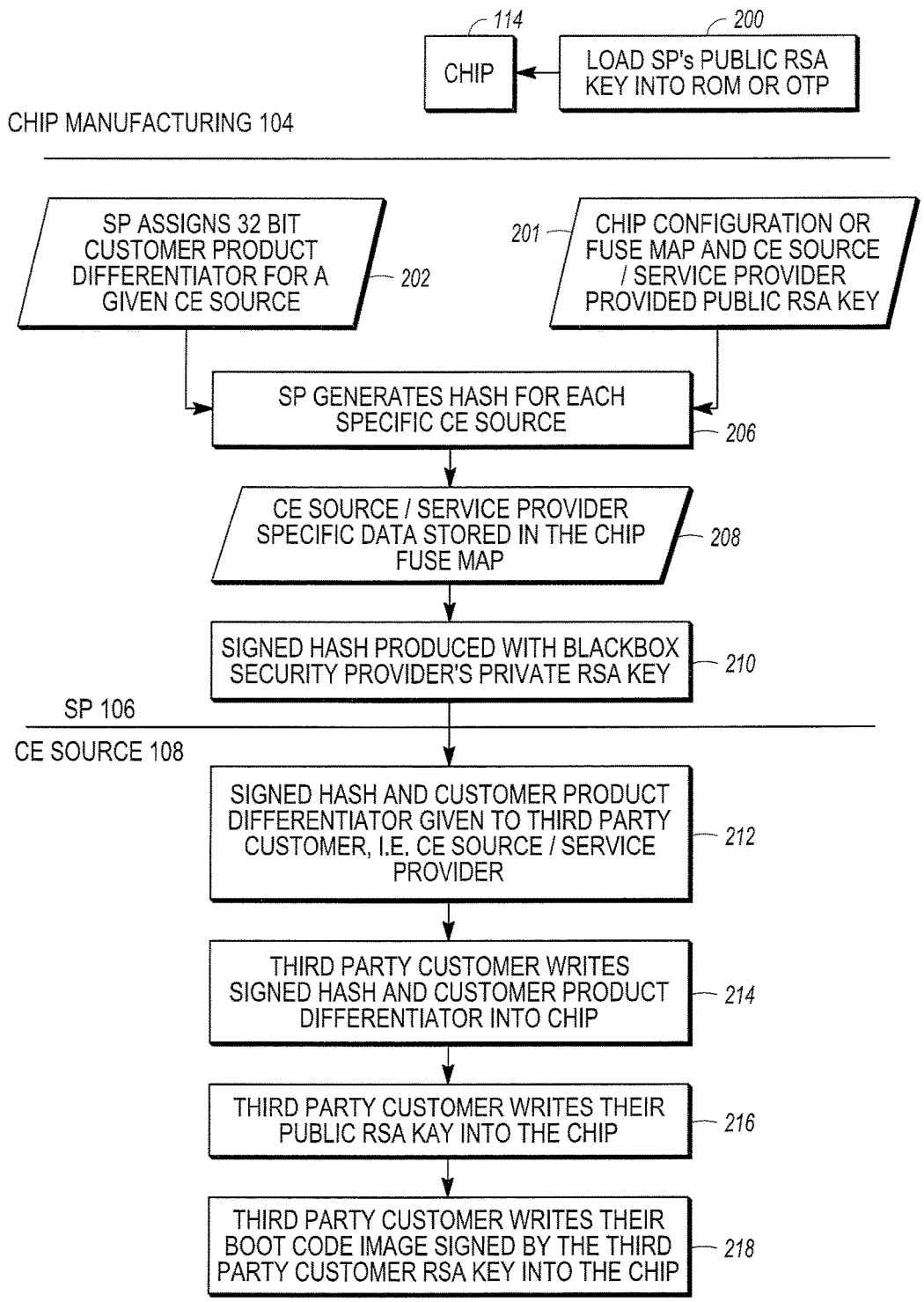
FIG. 2 illustrates the customer product differentiator field and signed hash block used to verify third party customer input data for fielded SOCs.

FIG. 2 is a diagram illustrating the use of the CPD 202. A customer product differentiator or CPD field 202 is generated and used with a signed hash block 210 to verify CE source 108 input data before that data is used in fielded chips 114 (i.e. deployed in fielded CE devices 112 installed at subscriber 110 locations). The security provider 106 uses the CPD 202 field as part of an input to fix chip 114 security data received from the CE source 108 (such as a specific flash-based CE source 108 public RSA key) to a given value. Optionally to further increase security, the address location for a flash-based third-party public RSA key and/or the CPD 202 can also be used fix input data for a given CE source 108 and incorporated into the signed hash block 210.

This process can be implemented as follows. In block 200, the public RSA key of the security provider 106 is stored in ROM 152A at the mask level or OTP 152B using the black box 116. Customer-specific data 208 is generated by combining the CPD 202 with a public key 201 of the CE source 108 and optional chip configuration information, as shown in block 206.

Chip configuration information may vary according to the CA functions to be implemented by the chip 114 in the CE device 112. For example, a particular chip 114 may have the ability to implement a plurality of encryption/decryption schemes, depending on the setting of internal flags of the activation of internal fuses 156. The chip 114 configuration information may describe the enabled functionality of the chip 114 by indicating, for example, which flags are set and/or which fuses 156 are activated.

Typically, the above combination operation 206 is performed by the security provider 106. In one embodiment, the CPD field 202 is assigned by the security provider 106 and the combining operation of block 206 is a hash operation. The result is CE source 108 data 208 that is unique and specific to that CE source 108 and customer product. This data may be stored in a map which controls the activation of fuses 156.

In block 210, the customer-specific data 208 generated above is signed with a private key of the security provider 106 $Kpr_{SP}$. In blocks 212 and 214, this signed combination and the customer product differentiator or CPD 202 is provided to the CE source 108. The CE source 108 writes the signed customer data 208 and the customer product differentiator or CPD 202 to a memory 152 of the chip 114. The customer data 208 signed with the security provider's 106 private RSA key is also securely stored at the CE source 108 site for use in the generation of future customer operations.

In blocks 216-218, the CE source 108 writes their CE source public key ($Kpu_{CE}$) into a memory 152 of the chip 114 and also writes an image of the CE device 112 boot code signed by the private key of the CE source 108 into memory 152c of the chip 114. Boot code comprises coded instructions that are verified and executed automatically when a CE device 112 is powered up.

The chip 114 is thereafter installed into the customer device 112 by the CE manufacturer 108A, and provided to the subscriber 110 for use. When the customer device 112 and chip 114 are powered up, a boot code 314 is verified, then executed by the chip 114, as further described with reference to FIG. 3.

Continuing with the operations illustrated in FIG. 2, the security provider 106 generates the signed hash block 208 over the customer-specific data using the chip 114 configuration (provided in block 201), the CE source's public RSA key, and the CPD field 202. The CE source 108 can store the signed hash CPD field 202 in one time programmable (OTP) memory 152B location of the chip 114 as shown in block 214, however, the CPD 202 could reside in flash memory for example in cases where there is not enough OTP or the chip 114 does not support OTP. If the CE source 108 or other entity were to alter the CPD field 202 or the CE source's public RSA key, then the RSA signature validation described below and illustrated in blocks 310 and 312 using the security provider's 106 signed hash block 308 would fail and the chip 114 will not completely execute the boot code instructions, and will chip 114 and CE device 112 will be otherwise unusable. This is further described below.

The security provider's public RSA key is embedded in Read Only Memory (ROM) 152A or One Time Programmable memory (OTP) 152B within the chip 114 as described below with reference to FIG. 3. This serves as the hardware root of trust in the chip 114.

Boot ROM Signature Check

U.S. Patent Publication 2007/0180464, entitled ""Method and System for Restricting use of Data in a Circuit," (hereby incorporated by reference herein) discloses a method for checking the signature of boot code stored in ROM. These techniques can be extended to support code protection as discussed herein.

The security provider 106 supplies a 2048 bit RSA public key that is stored in a ROM 152A of the chip 114 or an OTP bank 152B within the chip 114, as shown in block 200.

An Elliptical Curve Cryptography (ECC) key could also be used to perform asymmetric cryptographic operations in a similar manner to which is described below using RSA. Public key storage in a ROM 152A of the chip 114 is preferred and is the most secure location because it cannot be changed in the field, however, storage as data in the OTP 152B still provides a hardware root of trust. This can be implemented by programming the chip 114 using the black box 116 provided by the security provider 106 during chip 114 manufacturing.

The chip 114 may also include boot code that is used upon power up to boot or start the chip 114. In one embodiment, this boot code is signed by the CE source's private key, before storage in the chip 114 so as to permit later validation before further processing as described below.

Figure 3:
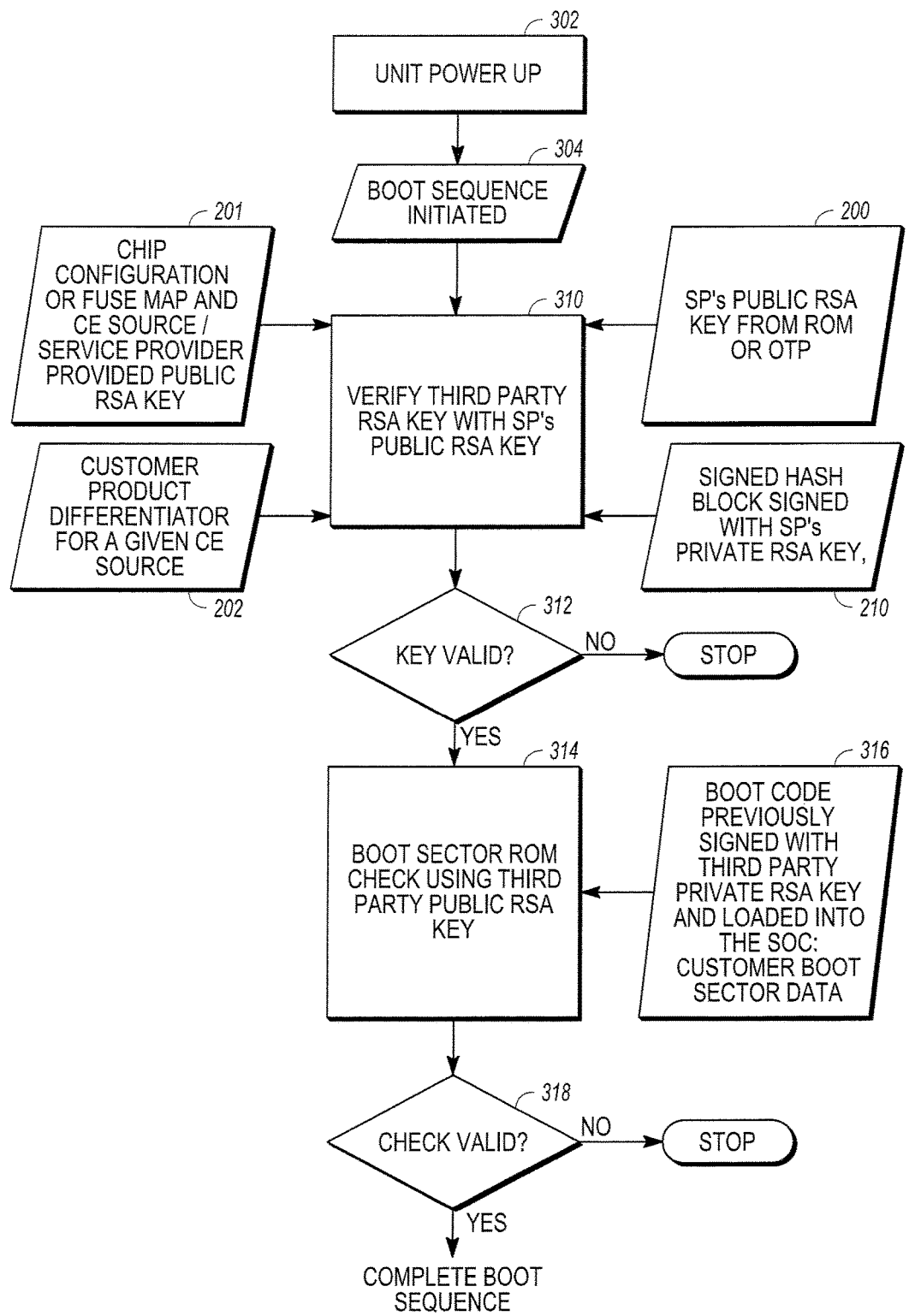
FIG. 3 illustrates the Boot ROM signature check over the code section enabling insertion of a CA vendor Public RSA key in a fielded SOC.

FIG. 3 is a diagram presenting an exemplary embodiment of how the boot code image can be verified before it is executed by the chip 114. When the CE device 112 is powered up, a boot sequence is initiated by the chip 114, as shown in blocks 302 and 304. Next, the public key of the second entity (in this case, the CE source 108) is verified.

Recall that the signed hash (which was generated with the CE source's public RSA key and the CPD) was stored in block 214 and the CE Source's public key was stored in the chip 114 in block 216. That hash can be recomputed in the chip 114 using the CPD 202 that was stored in the chip 114 in block 214, the CE Source public RSA key stored in the chip in block 216, and the chip configuration data. Further, the signature over the hash, i.e. the signed hash, stored in block 214 can be verified using the security provider's 106 public key which is retrieved from the ROM 152A or OTP 152B of the chip 114. The hash will only be equivalent to the recomputed hash if the CE source's public RSA key written in block 216 is equivalent to the CE source's public RSA key used to generate the hash in block 206 are equivalent.

If the comparison indicates that the CE source's public key is not valid, processing stops and the chip 114 will fail to exit the reset mode. If the comparison indicates that the CE source's public key is valid, processing is passed to block 314 where the boot sequence is verified using the verified CE source's public key.

If the boot sequence is verified, the boot code image is verified as shown in blocks 314-318 and the boot code is executed. If the boot sequence is not verified, chip 114 will again fail to exit the reset mode and will be non-operational.

In the above operations, a hardware security co-processor built into the chip 114 can read the CE source's public RSA key (which was stored in block 216) from memory such as a flash location in the chip 114 and use it to verify the stored signature for the customer application code that has been calculated over the entire section of customer application code to be downloaded for execution. The chip 114 memory location from which the security provider's 106 public RSA key is read may be fuse 156 locked to a specific ROM 152A or OTP 152B key by the chip manufacturer 104, that is, at electronic wafer sort or when sensitive immutable data is stored in the chip 114 by the black box 116 provided to the chip manufacturer 104 by the security provider 106. In one embodiment, once the location of the security provider's 106 public RSA key 200 has been selected, it cannot be changed in the field. This security provider 106 public RSA key is used as the chip's hardware root of trust in code signing, thereby, enabling use of at CE source 108 or CA vendor 108B public RSA key.

The main processor or central processing unit (CPU) 150 of the chip 114 incorporated into the CE device 112 may be held in a reset mode until the boot code check of blocks 314-318 is completed, thereby, eliminating the possibility of executing unknown user or malicious boot code.

Typically, the chip 114 must support the ability to extend the public ROM/OTP keys held by the security provider 106 to CE source 108-defined RSA keys by checking a signed hash stored in the chip 114. This enables a first entity, such as the security provider 106, to sign the public RSA keys of the second entity (such as the CE source 108-defined public RSA keys) and allows validation of the CE source's 108 public RSA key based on the security of the root of trust in the security provider's public RSA key stored in ROM/OTP 152A/152B. Preferably, this hardware-based validation process occurs in a secure manner that is not modifiable or accessible by other elements in the CE device 112 such as a general-purpose processor 904A or general purpose processor 904B. This process is typically controlled by a hardware state machine or performed on a separate embedded security co-processor executing from a private secure memory location.

The signed hash 210 used to validate the CE source's public RSA key incorporate the CPD 202 field assigned by the first entity (the security provider 106) to properly bind the CE Source's public RSA key to a specific party, that is, the CE Source 108 to which the CPD 202 was assigned. Incorporating additional information such as the address of the memory 152 location of where the CPD 202 value and/or CE source's public RSA are stored further limits potential attacks by fixing values to particular areas in a map of the memory 152 of the chip 114.

Having either the CPD field 202 or CPD address field incorporated into the signed hash 210 also enables the CE source 108 to assign an alternate CPD field 202 and/or CPD address, either of which enables switching from a first CA vendor 108B1 to a second CA vendor 108B2 as discussed below.

Incorporating either the CPD field 202 or CPD address field into the signed hash enables the CE Source 108 to revoke a previously assigned CE source 108 public RSA key by changing the value of the CPD 202 itself, assigning a new CE source public RSA key for a new CE source 108 and sending a new software image as is also discussed below. The previously signed CE source public RSA key will no longer be successfully validated by the security provider's signed hash 210 since the signed hash incorporates the old CPD value 202, which will no longer pass the verification process of blocks 310 and 312 of FIG. 3 since the CPD value 202 has changed, thereby, revoking the signed hash 210 and previous CE source public RSA key. The previous CE source public RSA key could be used once again if the security provider 106 provides another signed hash 210 using the old CE source public RSA key, an old CPD value 202 with a new CPD address because the new address could used to store the previously old CPD value.

The generation of the signed hash 210 is typically accomplished using the security providers' private RSA key and the chip manufacturer's supplied tool chain at the security provider's 106 trusted facility. The security provider 106 may generate the signed hash 210 through use of publicly available tools such as OpenSSL or custom tools developed by the security provider 106. The signed hash 210 validation in the chip 114 occurs using the security provider's public RSA key stored in the ROM/OTP of the chip 114.

As an alternative to switching CA systems, a broadcaster or service provider 102 may decide to enable the CA functionality of multiple CA systems provided by multiple distinct CA vendors 108B (e.g. CA vendor 108B1 and CA vendor 108B2) to be implemented in a single CE device 112. In this case, the broadcaster or service provider 102 may assign a single CPD 202 and CE Source public RSA key 201 to verify a CE device 112 boot image that combines the security functionality of both CA vendors 108B1 and 108B2. In this case, the boot code may combine and integrate two distinct portions, a first portion for the first CA vendor 108B1, and a second portion for the second CA vendor 108B2. Since current chip 114 designs cannot independently verify the signed hashes for two distinct boot code regions with two different public keys, a common CE source public RSA key 201 can used to verify the combined boot code portion containing the boot sequence for both CA vendors 108B1 and 108B2. In future chip 114 designs that can do so, a separate CA vendor public RSA key 201 can be used for each boot code portion.

The signed hash 210 may be incorporated in the boot flash image 152C by the CE source 108 as shown in 316 using tools provided by the chip manufacturer 104 once the CE Source 108 has finalized it own boot code. The signed hash 210 is validated in the chip 114 each time the chip 114 is powered up and before the chip 114 exits the reset mode. The precise boot process may be chip 114-specific as defined by the chip manufacturer 104.

The chip 114 may support several security provider RSA public keys, however, the number of production ROM locations available in the chip 114 is typically limited due to physical storage sizing and timing for the availability of the data (i.e. the security provider's public RSA key placed in ROM must be available at the time of the initial chip design).

As described above, one of the unique features of the present invention is the ability for a standard chip 114 to be used with a multiplicity of different CE sources 108, service providers 120 and/or CA vendors 108B, with the security features customized for each CE source 108 and/or application. Typically, there are not enough ROM hardware slots in the chip 114 for all of the possible CE sources 108 to have their security data embedded in the ROM for the production chip 114. Also, since all CE sources 108 are typically not known during the development phase of the chip 114, the security data of every CE source 108 cannot be incorporated into the more secure production ROM during the development stage. The techniques discussed below extend the public RSA key of the security provider 106 as the hardware root of trust to multiple CE sources 108, service providers 102 and/or CA vendors 108B to enable in-field switching and or augmentation of CA functions implemented in the chip 114 and without the use of a black box 116. Instead, this programming system takes a generically manufactured chip 114 and binds a specific flash memory-based CE source 108-provided public RSA key 201 to a particular customer such as the CE Source 108 or service provider 102 utilizing the security provider's ROM/OTP-based public RSA key 200 as the hardware root of trust.

Secret OTP Value (SV) Use to Protect Sensitive Data

A secret value (SV) 451 programmed by the security provider 106 can be stored in the chip 114 OTP memory 152B, and that SV 451 can be used to indirectly modify or manipulate sensitive data that is externally supplied to the chip 114. Such sensitive data can be supplied from the service provider 102 via a broadcast, a third party CA vendor 108B, a USB port, Internet server, DVD or similar means.

Figure 4A:
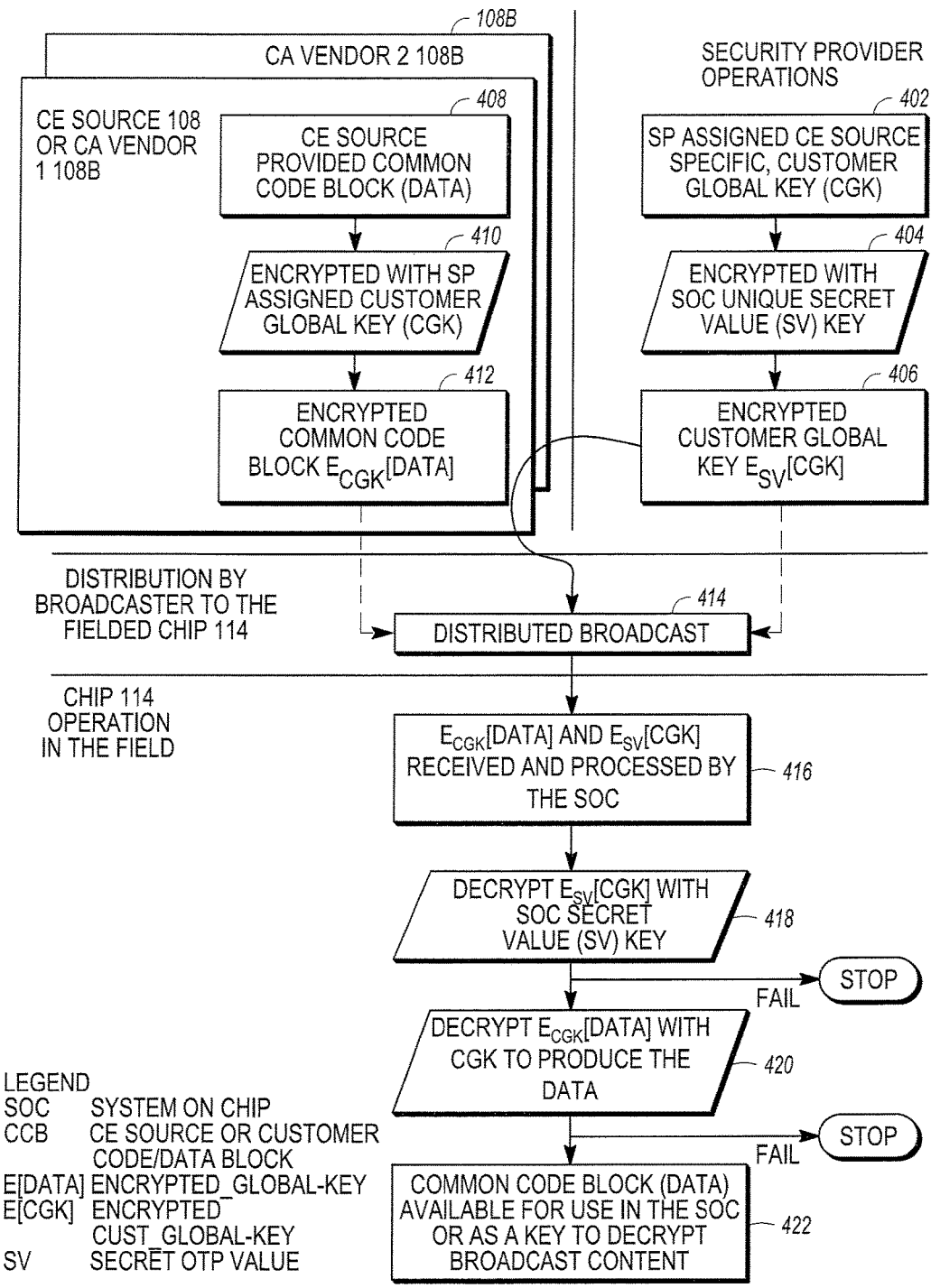
FIG. 4A illustrates use of a Secret Value stored in hardware to protect a given CA vendor customer's common block of data or key.
Figure 4B:
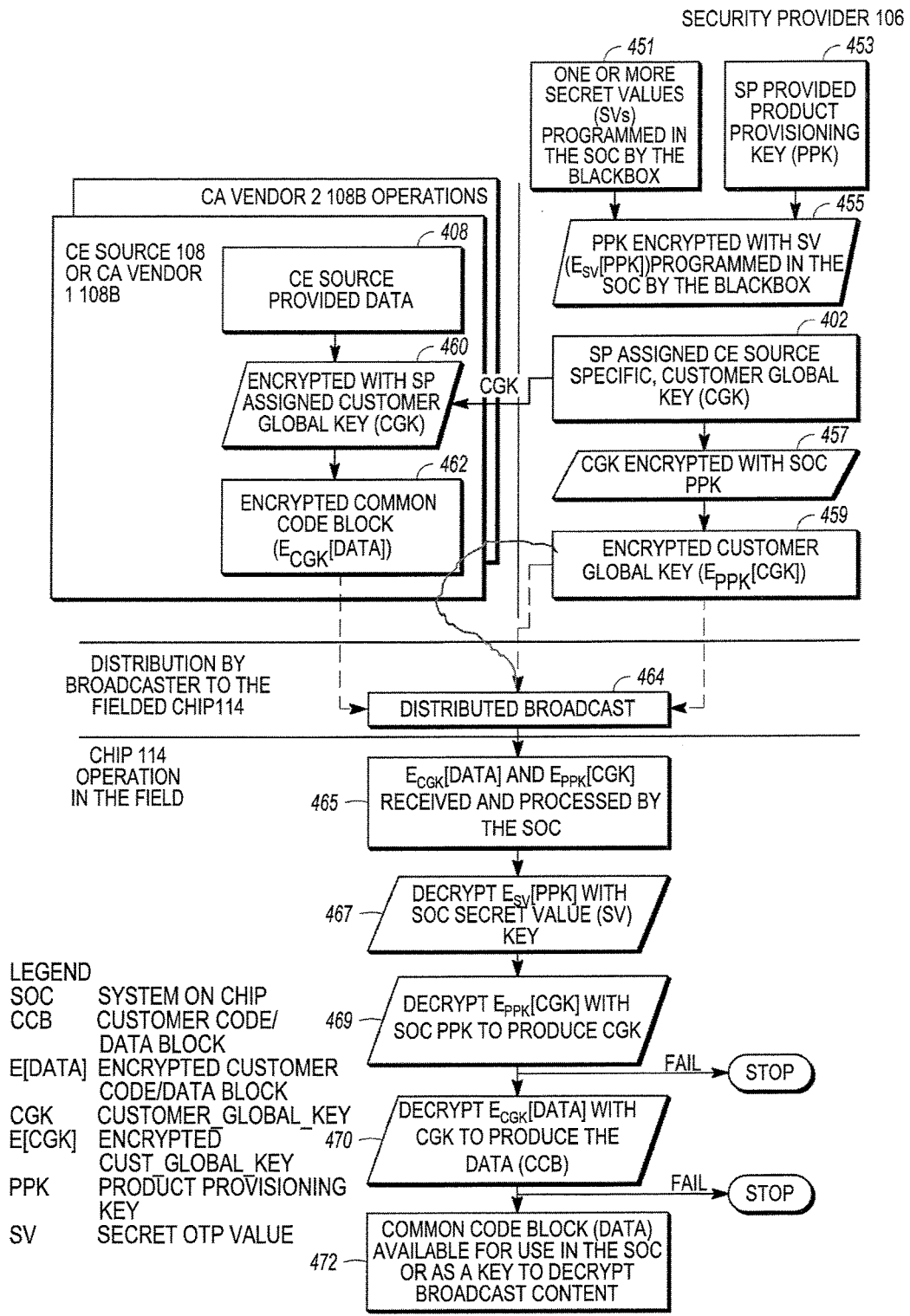
FIG. 4B illustrates use of a Secret Value and Product Provisioning Key both stored in hardware to protect a CA vendor's common block of data or key.

FIG. 4A and FIG. 4B are diagrams illustrating how data (D) can be securely received from one or more CA vendors 108B and can be provided for use by the chip 114 in a CE device 112. The data is protected from access by unauthorized CA vendors 108B and potential attackers. Such data (D) may be a key for decrypting media programs transmitted by the service provider 102 using the CE device 112, a common code block of data 408 including instructions for execution by the CE device 112, or similar data.

A customer global key (CGK) 402 is generated or assigned by a first entity such as the security provider 106 and transmitted to a second entity such as the CE source 108 or a first CA vendor 108B1. The data (D) 408 of interest is encrypted according to the customer global key 402 provided by the security provider 106 to produce encrypted data $E_{CGK}[D]$ as shown in block 410. In a third party black box programming architecture performed by the security provider 106, this encryption may be performed, for example, by the second entity or CE source 108 or CA vendor 108B. The security provider 106 may select the CGK uniquely for each CE source 108 or CA vendor 108B. Since the CGK is unique to each CA Source 108A/CA Vendor 108B, sensitive intellectual property such as code or data can cryptographically isolated and protected from successive CA vendors 108B in case switching of CA systems or vendors is desired. Such CA systems from CA vendors 108B can concurrently be implemented in the CE device 112.

In block 404, the customer global key (CGK) 402 is also encrypted according to a secret value (SV) key by the security provider 106 (or CE source 108) to produce an encrypted customer global key $E_{SV}[CGK]$ 406. In one embodiment, each chip 114 has a unique SV key 451, and the security provider 106 or CE source 108 encrypts the CGK uniquely for each chip 114 using that chip's unique SV key 451.

The encrypted customer global key $E_{SV}[CGK]$ 406 and the encrypted data $E_{CGK}[Data]$ 412 are then transmitted or distributed to the CE device 112 and the chip 114, where it is received and processed, as shown in blocks 414 and 416. Transmission can be by physical transfer of a storage medium or using wired or wireless data transmission. The encrypted customer global key $E_{SV}[CGK]$ 406 is then decrypted according to the SV key 451 stored in the chip 114 to reproduce the customer global key 403 and the encrypted data $E_{CGK}K[Data]$ is decrypted with the reproduced customer global key CGK to reproduce the data (D), as shown in blocks 418 and 420. Either or both of these operations can be performed by a third entity (for example, the user's fielded CE device 112 using the chip 114). In one embodiment, these decryption operations are hardware controlled and not accessible or modifiable by the CE device 112. It is important to note that the CGK is not shared between potential CA vendors 108B and that this cryptographic isolation is maintained in the chip 114 by encrypting the CGK with the SV key that is unique to each chip 114.

When needed, the CGK may again be decrypted using the SV key within the key ladder (a secure processing engine that handles security keys in the chip 114 without exposing such secrets to the main CPU or exporting key material for access by software) with the results of this decryption unavailable to the software of the main CPU, thereby supporting both CA switching and CA co-existence in the CE device 112.

In block 420, the decrypted CGK 402 is used to decrypt the $E_{CGK}[Data]$ 412, resulting in the Data 408, which is used by the chip 114 to perform security related functions such as decrypting the media program. The decrypted Data 408 can also be a key used to further decrypt the broadcast content or a common block of code/data, as shown in block 422. If the operations of blocks 418 or 420 fail, processing stops, as shown in FIG. 4A. The foregoing operations can be used to transmit data from a second CA Vendor 108B2 as well.

FIG. 4B shows another embodiment of how to securely distribute data from the service provider 102 or CA vendor 108B. In this embodiment, the CGK 402 remains unique to each CA vendor 108B and cryptographic isolation is maintained in the chip 114 by use of a product provisioning key (PPK) 453 that is not shared with any other CA vendor 108B or third party. When needed, the CGK 402 is decrypted with the PPK 453 within the chip's 114 secure key processing engine that handles content protection keys, the key ladder, whose results are not available to software of the main processor of the chip 114, thereby supporting switching between CA systems (which may be supplied by different CA vendors 108B) co-existing in the CE device 112. Support for CA switching and CA co-existence is discussed in detail in the sections below.

The security provider 106 generates a secret value (SV) 451 that is unique to each chip 114 and a product provisioning key (PPK) 453 that is unique to a particular chip 114 design or model, but not unique to a particular chip 114. The PPK 453 could be changed for a given number of chips 114 programmed by the black box 116 or manufactured for a specific period of time. The SV 451 is programmed into the chip, as shown. Further, the PPK 453 encrypted by the SV 451 is also generated and programmed into the chip 114. These programming operations are performed by the chip manufacturer 104 using the black box 116 provided to the chip manufacturer 104 by the security provider 106. New keys are periodically loaded into the black box 116 which resides at the chip manufacturer 104 by encrypted DVDs or USB drive images created by the security provider 106 at their secure facility.

A customer global key (CGK) 402 is generated by a first entity such as the security provider 106 and transmitted to a second entity such as the CE source 108 or CA vendor 108B. The data (D) 408 is encrypted according to the customer global key 402 to produce encrypted data $E_{CGK}[D]$ as shown in block 460. The encryption of the data (D) may be performed, for example, by the second entity such as the CE source 108 or CA vendor 108B.

As shown in block 457, the customer global key (CGK) 402 assigned by the security provider 106 is also encrypted according to a product provisioning key (PPK) 453 by the security provider 106, as shown in block 457 to produce an encrypted customer global key $E_{PPK}[CGK]$ 459. The security provider 106 selects the CGK 402 uniquely for each CE source 108/CA vendor 108B combination, thus enabling the security provider 106 to support many third party CA Vendors 108B and/or CE Sources 108 using chips 114 from multiple chip manufacturers 104 while cryptographically isolating the CGK 402 intended for use by one CA Vendor 108B1 from that used by another CA Vendor 108B2 and potential attackers by use of the PPK 453.

The encrypted customer global key $E_{PPK}[CGK]$ 459 and the encrypted data $E_{CGL}[Data]$ 462 are then transmitted or distributed to the CE device 112 and hence, the chip 114, where it is received and processed, as shown in blocks 464 and 465. This can be accomplished by physical transmission of media storing the encrypted customer global key $E_{PPK}[CGK]$ 459 and the encrypted data $E_{CGK}[Data]$ 462 or by electronic transmission of the data, by wireless or wired means since the sensitive data is encrypted. Also, the security provider 106 may transmit the encrypted customer global key $E_{PPK}[CGK]$ 459 to the CE source 108, and the CE source 108 may transmit both the encrypted customer global key $E_{PPK}[CGK]$ 459 and the encrypted data $E_{CGK}[Data]$ 462 to the CE device 112.

The encrypted PPK 453 is recovered by decrypting $E_{SV}[PPK]$ that was programmed into the chip 114 using the SV programmed into the chip. This is shown in block 467. The encrypted customer global key $E_{PPK}[CGK]$ 459 is decrypted according to the recovered PPK 453 to reproduce the customer global key CGK 402 as shown in block 469 and the encrypted data $E_{PPK}[Data]$ is decrypted with the reproduced customer global key CGK 402 to reproduce the data 408, as shown in blocks 470 and 472. Either or both of these operations can be performed by a third entity (for example, the user's fielded CE device 112 using the chip 114). In one embodiment, these decryption operations are hardware controlled and not accessible or modifiable by the chip's main processor or any other processor associated with the CE device 112.

If the operations in blocks 469 or 470 fail, processing stops, as shown in FIG. 4B.

The decrypted data 408 is typically data that is used by the chip 114 to perform security related functions. For example, the decrypted data 408 can include a key used to decrypt the broadcast content or can be a common block of code/data for performing security related functions. The data may also comprise a media program decryption key also known as the control word (CW) and/or a pairing key (PK) that cryptographically binds the CE device 112 with an external device such as a smart card.

Secure Product Code-Data Provisioning by Arbitrary Third Party Customers

Figure 5A:
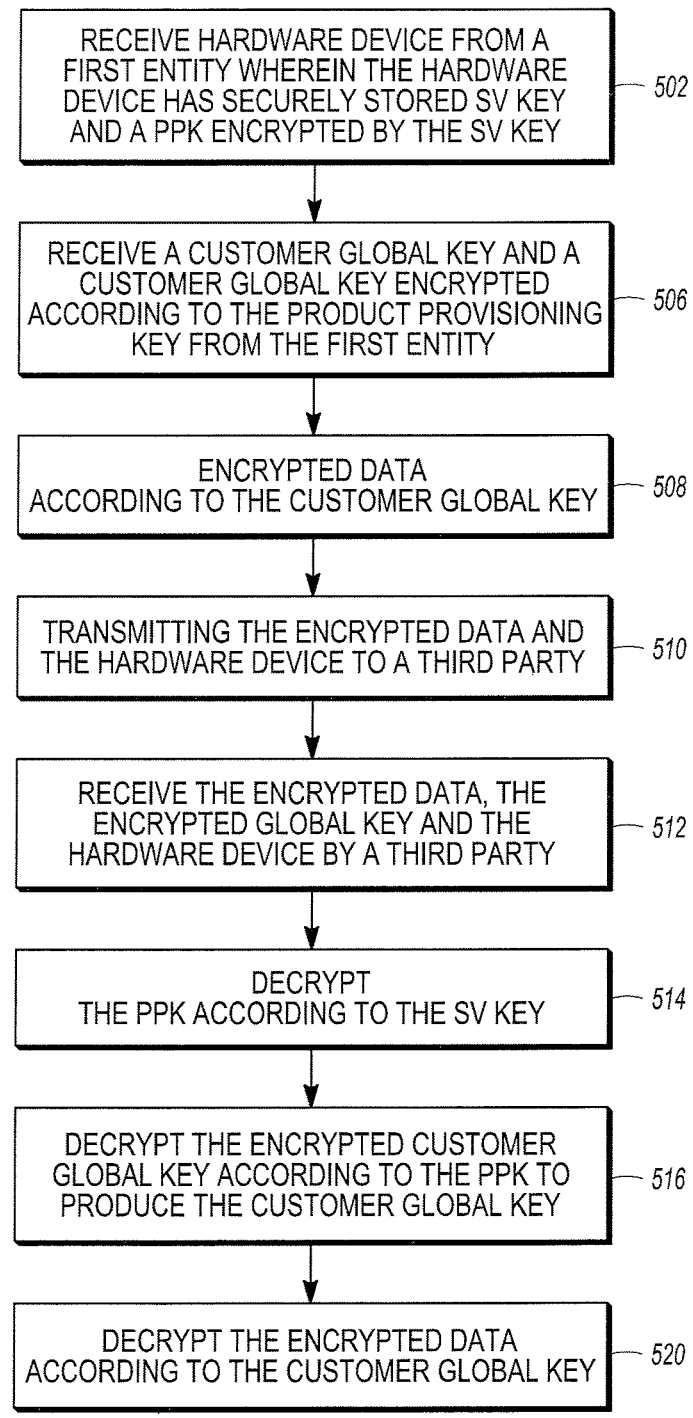
FIG. 5A is a diagram presenting illustrative method steps that can be used to enable encryption of sensitive code or data and provide it to an independent CA vendors or untrusted consumer electronics (CE) device manufacturer for provisioning.

FIG. 5A is a diagram presenting illustrative method steps that can be used for the encryption of sensitive code or data to enable cryptographic separation of code and data for different CA vendors 108B and CA co-existence. The encrypted block can be provided to an untrusted consumer electronics (CE) device manufacturer 108A for provisioning.

The hardware device such as a chip 114 is received from a first entity such as the security provider 106, wherein the hardware device has a securely stored SV key 451 and a product provisioning key (PPK) 453 encrypted by the SV key ($E_{SV}[PPK]$), as shown in block 502. A CGK 402 and the CGK encrypted according to the PPK 453 ($E_{PPK}[CGK]$ 459) is received from the first entity, as shown in block 506. The Data is 408 encrypted according to the customer global key to produce encrypted data ($E_{CGK}[Data]$ 462), and the encrypted data $E_{CGK}[Data]$ 462 and hardware device are transmitted to a third party, as shown in blocks 508 and 510. In one embodiment, the SV key and the encrypted product provisioning key $E_{SV}[PPK]$ 455 are securely stored in the hardware device 114 via a black box 116 the first entity.

The encrypted data $E_{CGK}[D]$ 462, the encrypted customer global key $E_{PPK}[CGK]$ 459, and the hardware device 114 are received by the third party such as a CE Source or CA vendor 108B, as shown in block 512, and installed into the CE device 112.

The encrypted product provisioning key $E_{SV}[PPK]$ 455 is then decrypted according to the SV key 451 stored in the chip 114, as shown in block 514. The encrypted customer global key $E_{PPK}[CGK]$ 459 is then decrypted according to the decrypted PPK 453 to produce the customer global key CGK 402, as shown in block 516. Finally, the encrypted data $E_{CGK}[Data]$ 462 is decrypted according to the customer global key, as shown in block 520. The data is then available for use.

Figure 5B:
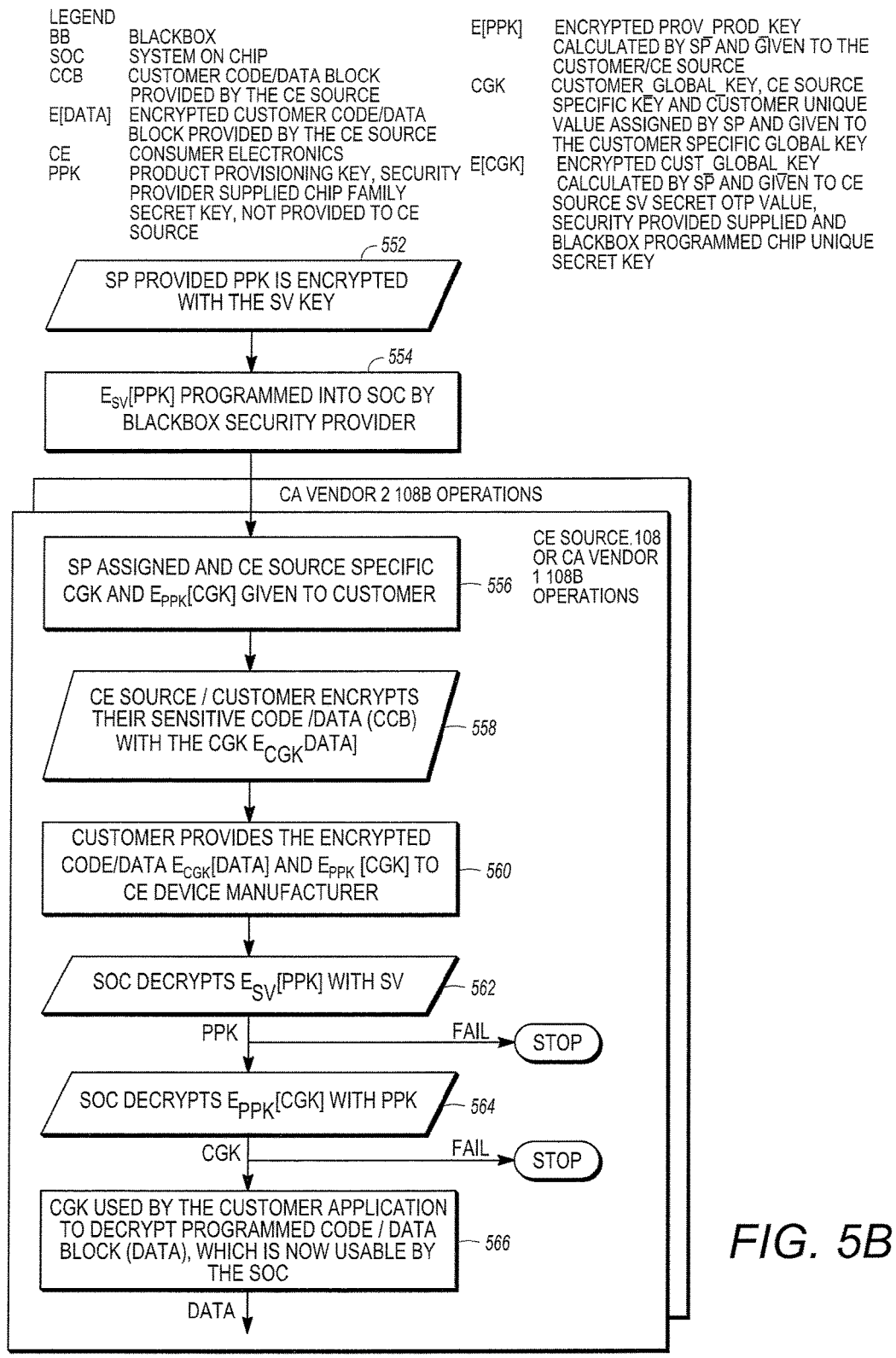
FIG. 5B is a diagram illustrating use of a product provisioning key and secret value stored in hardware to protect a CA vendors' common block of data or key enabling in-field insertion of a secret value post SOC manufacturing.

FIG. 5B is a diagram showing a specific example of the operations presented in FIG. 5A. The security provider 106 defines a PPK 453 and a SV 451, and programs the PPK 453 encrypted by the SV key 451 into the chip 114, as shown in blocks 552-554. This is accomplished via the security provider's black box 114 disposed at the chip manufacturer 114. Typically, the PPK 453 is held secret and not exported to software in the CE device 112, which would leave it vulnerable to unauthorized attack.

The security provider 106 then provides each CE source 108 (i.e. CE manufacturer 108A/CA vendor 108B combination) with a different customer global key, CGK 402 (in one embodiment, a 128 bit value) and the CGK 402 encrypted with the PPK 453, referred to as the $E_{PPK}[CGK]$, as shown in block 556.

The CE source 108 encrypts their sensitive code/data (D) 408 with the CGK 402, as shown in block 558, and provides the encrypted code/data to the CE manufacturer 108A during CE device manufacturing for the initial load, as shown in block 560. The chip 114 decrypts $E_{SV}[PPK]$ to obtain the PPK, and decrypts the $E_{PPK}[CGK]$ using the obtained PPK 453 to produce the CGK 402, which is thereafter usable by the third party software application such as CE device 112 or a Set Top Box (STB) User Interface (UI) code executing in the chip 114, as shown in blocks 562-566. This allows the CGK 402 to be unique to each CE Source 108 (CE manufacturer 108A/CA Vendor 108B) combination without revealing the PPK external to the security provider 106 and assures that the CGK 402 is known only to the CE Source 108 combination it is assigned to and no other party, excepting the security provider 106, which assigned the CGK 402. This enables the PPK 453, CGK 402, and SV 451 from distinct CA vendors 108B to be used independently without exposing these keys or other data to other CA vendors 108B or third parties. As a consequence, different key sets ($E_{PPK}$[CGK] 459 and CGK 402) can be allocated to each CA vendor 108B. This permits a plurality of CA vendors 108B to implement CA functionality on a single chip 114.

Using this process, the CA vendor-specific CGK 402, the protected code/data segment 408 and the global PPK 453 are not exposed outside the hardware controlled key ladder of the chip 114, which is the secure key processing engine that handles content protection keys. Again, the PPK 453 is held secret by the security provider 106 and not given to the chip manufacturer 104 or any third party and the CGK 402 is never given a third party outside the CE source 108 or CA vendor 108B.

Among the advantages of this scheme include:
(1) The global chip 114 secret, PPK 453, is not given to the chip manufacturer 114 or any third party. It is held secure by only the security provider 106;
(2) Each CE source 108 or CE manufacturer 108A/CA vendor 108B combination receives their own provisioning key, CGK 402; and
(3) A hardware chip 114-unique secret (SV 451) is used as the root of trust, and each CA vendor 108B can be provided a different SV key when several chip unique SVs are provisioned in the chip 114 during black box 116 manufacturing.

In one embodiment, the security provider's programming is tied to a particular chip 114 identified by a public value referred to as a Product Identifier (PID) 600. The chip 114 is uniquely programmed and provisioned by the security provider's black box 116 and tracked by the chip manufacturing process. The programming methodology taught in this disclosure enables the placement of secondary provisioning/activation server at third party CE product manufacturing facilities 108A to track actual CE devices 112 produced and tested as opposed to chips 114 manufactured by the SOC chip manufacturer 104. This secondary provisioning/activation server can be located in the CE Source Operations of FIGS. 4A and 4B. The programming methodology taught in this disclosure can automate reporting (at chip 114 fabrication and CE device 112 manufacturing) and less is hands-on for authorized third parties to track production of CE devices 112 for accounting purposes such as determining royalty payments for software licensing. This solves a major problem for CE manufacturers 108A who may not be receiving accurate reports from suppliers or distributors for royalty payment purposes for licensed software or hardware that the CE manufacturer 108A is due.

The other significant advantage with this architecture is that security is enforced purely in hardware, which is significantly harder to defeat than software based implementations. Hardware based storage, which cannot be modified by a third party customer or an attacker, can be used for the security provider's Public RSA or security provider's ECC key, CPD field 202, first secret value (SV) 451, one or more additional secret values (SV2, SV3, SV4, etc.), product identifier (PID) 600, JTAG unlock and $E_{SV}$[PPK] 455 (the PPK encrypted with the SV).

Product Identifier (PID) Assigned to Arbitrary Customers

Figure 6:
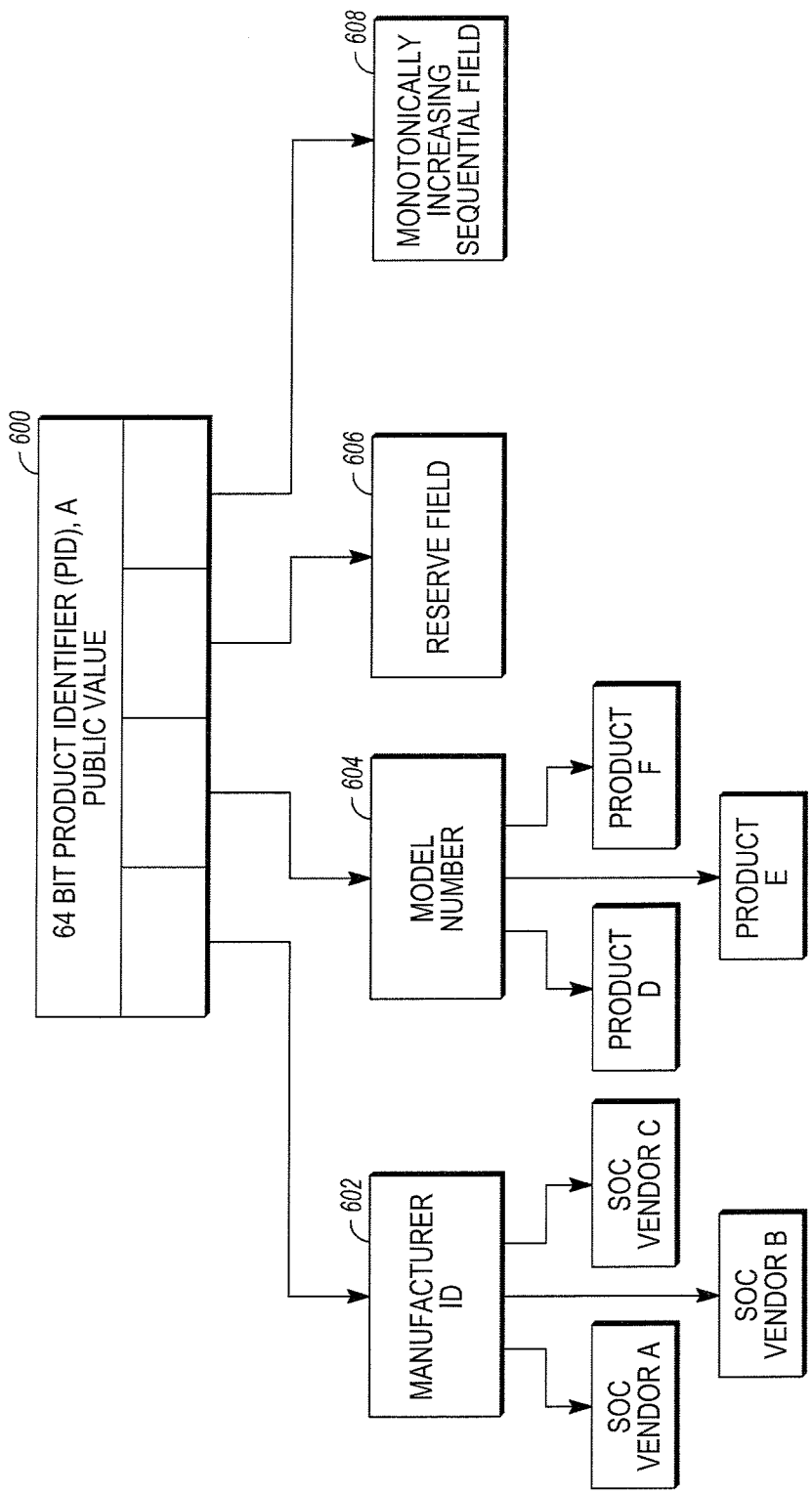
FIG. 6 is a diagram of one embodiment of the product identifier (PID) described above.

FIG. 6 is a diagram of one embodiment of the product identifier (PID) 114 described above. The PID 600 identifies the specific chip 114 (not just the chip 114 configuration), and may be provided to the CE source 108 after the chip 114 is manufactured. In one embodiment, the PID is a 64 bit Public CE Device ID that is generated by the security provider 106 and programmed in the chip 114 by the black box 116.

The security provider 106 ensures that the PIDs 600 are globally unique across all supported products, that is, across multiple chip manufacturers 104 and multiple CE device manufacturers 108A. A system-wide unique value is needed to ensure that any manufactured chip 114 can be allocated to any customer.

In one embodiment, the PID 600 consists of a chip manufacturer identifier 602, a model number 604 that specifies the type of chip 114 produced by that chip manufacturer 104, a reserve field 606 for future use and a monotonically increasing serial identifier 608 to uniquely identify the chip 114 within the product family and manufacturer.

Conditional Access System Swap with Different Key Sets

The infrastructure provided by the security provider 106 in chips 114 programmed by the black box 116 allows for a broadcaster or service provider 102 to change Conditional Access Systems (CAS) at its discretion.

In traditional systems for large CA Vendors 108B, the Conditional Access provider held the root RSA key used to sign the boot loading code. The boot loader code, which is used by the Set Top Box (STB) or CE device 112 internal software to validate and authenticate a software download it has received, performs this critical verification step. This is to ensure an authorized party provides the code. If the boot loader cannot successfully validate the code, the code received in the download message will be rejected.

The public portion of an RSA key root key is either part of the ROM mask set of the chip 114 or it is programmed into a secure portion of One Time Programmable (OTP) memory as part of the chip manufacturer's foundry process. This key can be used by the security infrastructure of the chip 114 to authenticate the download, which has been signed with the corresponding private key section of the programmed RSA key. If the signed hash 210 cannot be validated as shown in FIG. 3, then the public RSA key verified in 310 is not correct or does not match with the public portion of the RSA key (either 200 or 201), the chip 114 will not come out of reset or will not continue with its operations, depending on the security rules of the chip 114.

In the past, this RSA key signing and authentication process was held by the Conditional Access (CA) vendor 108B, which could block the broadcaster or service provider 102 from performing downloads to the fielded CE device 112 simply by not signing the code. If a broadcaster or service provider 102 wanted to change CA vendors 108B and did not get the ability to sign the code from the originating CA vendor 108B, then the only option available to the broadcaster or service provider 102 would be to change out the in field CE device 112 with one that it did have the proper download capability. This is a prohibitively expensive proposition for most broadcaster or service provider 102, which prevents them from running their system as they wish.

In this proposed infrastructure, the root public RSA key is extended by storing the CA vendor public RSA key in flash as shown in 216. In this case the CA vendor public RSA key 201 is either held by the broadcaster/service provider 102, or by a trusted third party that acts as an escrow entity. This allows the broadcaster or service provider 102 wide latitude in operating its system if it wishes to either change out CAS vendors 108B providers or to use multiple CAS systems in the field.

This infield CA vendor 108B replacement scheme enabled by the security provider 106 for its third party customers (i.e. service providers 102, CE source 108, and/or CA vendors 108B) utilizes a combination of the security provider 106 black box 116 programmed data and the security provider 106 assigned keys given to the third party customer. Keys and programmed values that enable switching CA vendors include the security provider 106 ROM RSA key, Product Provisioning Key (PPK) 453, the Customer Global Key (CGK) 402, third party customer RSA key 201 signed by the security provider's 106 private RSA key 210, the Customer Product Differentiator (CPD) 202, and one or more Secret Value (SV) keys 451.

Each chip 114 contains a unique public identifier (the PID) 600 and a private symmetric provisioning key (the Product Provisioning Key (PPK) 453). The PID 600 can be freely shared with any third party while the PPK 453 is kept private by the security provider 106 and is never released to any third party and/or Consumer Electronic (CE) Source 108. The JTAG password unlocks access to debug information and is only provided if the CE device 112 experiences an in field failure.

The security provider 106 black box 116 programs a series of Secret Values (SVs) 451 that are allocated to the individual CE source 108 and/or CA vendors 108B as the CE source 108 or CA vendor 108B requires as a part of its conditional access system to secure content distribution. If multiple SVs 451 are programmed by the service provider 102 via the security provider 106 black box 116 and distributed to the field, the service provider may later elect to provide one or more of these SVs to an individual CA vendor 108B when the CE device 112 is first used in the field or the service provider 102 can chose to save one or more SVs 451 for a subsequent CA vendor 108B switch for the fielded CE device at a later time.

These SV values 451 can both be provided by the security provider 106, i.e. 2 or more keys, and held in escrow or given to the broadcaster or service provider 102 to hold. Another option open to the broadcaster or service provider 102 is for one of the SV values 451 to be provided by the security provider 106 and the others provided by an external key source or some other CA vendor 108B.

This allows for the broadcaster or service provider 102 to have multiple CA vendors 108B operating in the field at the same time using one STB. This can be done so that the broadcaster or service provider 102 can segregate their markets by broadcast methodology (i.e. Cable, Satellite distribution, IPTV, etc.), region (i.e. different areas of a particular City or Country, or Geographic Location such as the Asia-Pacific market), or content package (High Definition Programming, Sports or Premium content) or any other market segmentation as market forces dictate.

For each CA vendor 108B, there is typically some type of code resident in the CE device 112, such as a Security Kernel, which is used to pass keys, perform certain housekeeping functions, etc. as deemed necessary by that vendor. Given that the broadcaster or service provider 102 has control over the in field download via the public RSA root key 201, it is a simple matter to update these Security Kernels in the field.

If the broadcaster or service provider 102 knows in advance that one or more CA vendors 108B may be operating on their network, the Security Kernels could be integrated into the "Golden Image" of the CE device 112 code at the manufacturing line, thus eliminating the need to do an in field download.

The broadcaster or service provider 102 would then be able to use the appropriate CAS infrastructure by utilizing the specific SV 451 and other associated keys for that vendor. Again, this type of flexibility is unprecedented in the Pay TV industry and is only possible utilizing the security provider 106 black box 116 programmed data and the security provider 106 assigned keys given to the third party customer, (i.e. service providers 102, CE source 108, and/or CA vendors 108B).

Switching CA Vendors for Fielded CE Devices

The keys and programming infrastructure found in the chip 114 as provided by an independent security provider 106 enables the fielded Consumer Electronic (CE) device 112 to change conditional access (CA) vendors 108B (hereinafter alternatively referred to as conditional access system (CAS) vendors), thus giving the service provider 102 or broadcaster more flexibility in managing their business. This can result in saving the service provider 102 a significant capital investment by using the provided security architecture (including the chip 114 and CE device 112) and downloading a new software containing an alternate CA vendor 108B application without having to replace fielded CE devices 112.

A service provider 102 or broadcaster can switch CA vendors 108B in a legacy conditional access system without swapping fielded CE devices 112 using the method specified herein. This in-field CA vendor 108B replacement scheme enabled by the security provider 106 for its third party customers utilizes a combination of black box 116 programmed data and security provider 106 assigned keys given to the third party customer (i.e. service providers 102, CE source 108, and/or CA vendors 108B). Keys and programmed values that enable switching CA vendors 108B include the security provider 106 ROM RSA key, PPK 543, CGK 402, third party customer RSA key 201 signed by the security provider's private RSA key Kpr$_{SP}$ (item 210), CPD 202, and one or more SV keys 451.

The foregoing description of describes a system boot code can be securely installed, verified, and executed in the CE device 112 and wherein data (D) used for conditional access can be securely provided to the CE device 112 for use in the conditional access system. The same procedures can be used to either provide additional conditional access functionality (e.g. to support a conditional access system provided by another CA vendor 108B) or to revoke the conditional access functionality of a CA vendor 108B and substitute that of another CA vendor 108B. Adding additional functionality to support another CA vendor 108B can be accomplished by the storage of additional security values, while revoking conditional access functionality of one CA vendor 108B to substitute another can be accomplished by replacing previously installed security values with the security values for the new CA vendor 108B.

For example, a generic bootloader 706 and/or SOC security driver can be installed in the flash memory of the System On a Chip (SOC) 114 using the procedures shown in FIG. 2 and FIG. 3 instead of the CE source 108 specific or secondary boot loader 710. This generic bootloader 706 and/or SOC security driver is capable of accepting a new customer flash application image for the CE device 112 and can authenticate a third party public RSA key 201 associated with the new CA vendor 108B stored in the new CE device 112 flash image as shown in blocks 302-312 of FIG. 3. The new CE device 112 application flash image includes:

A new third party RSA key (different from the previous third party RSA key 201 of FIG. 2), a new CPD 202 and a new $E_{PPK}[CGK]$ 459;

New customer flash conditional access application code 316 from the same or a new CA vendor 108B with its own content protection scheme;

An optional new CE device 112 application that potentially uses new conditional access application code to implement the conditional access system; and The security provider 106 defined code download and verification module will be included in the deployed software image.

When the CE device 112 reboots after the successful download, the new CE device application flash image is authenticated as shown in FIG. 3 with the new signed third party RSA key as shown in 310, new CPD 202, and new CA vendor 108B application, thereby, enabling the new CA vendor 108B application to take control of the CE device 112 and provide content protection services for the service provider 102.

Figure 7:
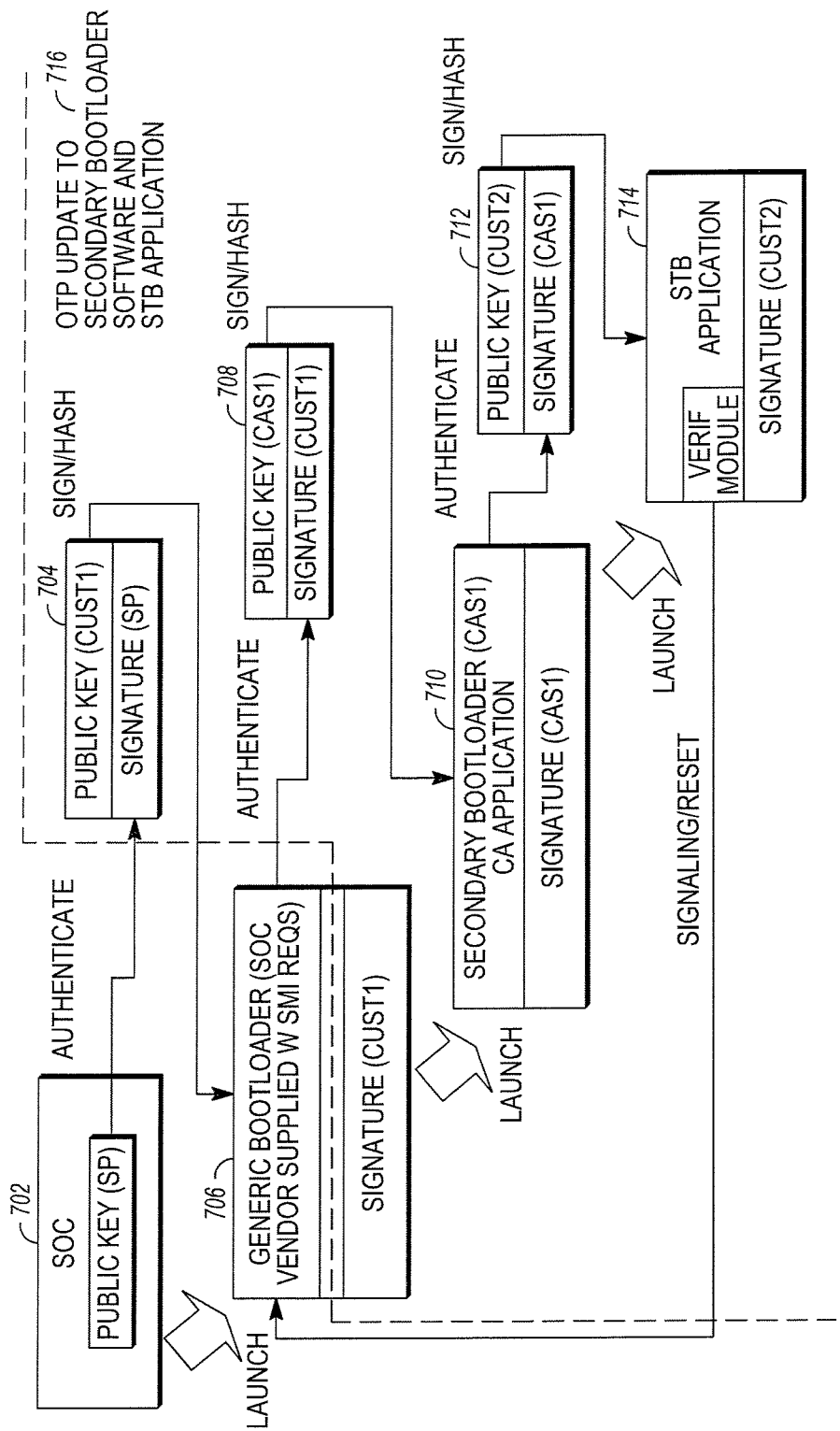
FIG. 7 illustrates the boot process, image signing and RSA public key authentication for over the air updates.

FIG. 7 shows a bootloader cascade beginning with the generic bootloader 706 authorizing the secondary bootloader 710 supplied by a CAS provider that in turn authorizes a STB application. The generic bootloader 706 is generally not replaced in the field. This bootloader 706 verifies Customer RSA key 201, i.e. Cust1 as shown in 708. The generic bootloader 706 does not contain the CAS vendor's 108B public RSA key 201. The generic bootloader 706 needs to be able to point to a new Over-the-Air (OTA) image 716 provided by the CAS vendor and load this image if the new image passes RSA Signature verification from FIG. 3. Subsequent STB reboots will load the new CAS OTA image 716, which may contain a revised secondary bootloader 710.

A download verification module resident in the STB Application monitors and guides the download process shown in 714. The code needed to download and authenticate the new CE Device 112 image is controlled by the security provider 106 and the broadcaster/service provider 102. The download verification module shown in 714 must be incorporated into the STB code image 716 to accept updates, validate updated image and re-launch the STB application. The download verification module shown in 714 assembles data segments of the encrypted image for the OTA update 716, verifies data integrity and assists generic bootloader 706 in validating the signature. Following validation of the signature, the image 716 is decrypted and made ready for re-launching the updated CE Device 112 image.

Table I lists the data used by the CE Source 108 and/or CA vendor 108B in their typical operation in providing a secure content distribution system for their service provider 102.

TABLE I

Typical keys and data fields used in providing a secure content distribution system

| Key and/or Security Field Name | Resident in | Who programs |
|---|---|---|
| SP Public RSA ROM/OTP key (from 210) | ROM/OTP | SP 102 or Chip Mfg. 104 |
| Customer Public RSA key (Cust Pub RSA Key) 201 | Flash | CE Source 106 in field |
| Customer Product Differentiator (CPD) 202 | OTP | CE Source 106 in field |

TABLE I-continued

Typical keys and data fields used in providing a secure content distribution system

| Key and/or Security Field Name | Resident in | Who programs |
|---|---|---|
| Hash of Customer Public RSA & CPD (Hash) 208 | Flash | CE Source 108 in field |
| Signed Hash of Customer RSA key and Customer Product Differentiator (Signed Hash) 210 | Flash | CE Source 108 in field |
| Customer signature over signed code (Cust Sig) 218 | Flash | CE Source 108 in field |
| One or more Secret Value (SV) Key(s) 451 | OTP | SP 102 by black box 116 or via SV insertion |
| Encrypted Product Provisioning Key ($E_{SV}[PPK]$) 455 | OTP | SP 102 by black box 116 |
| Encrypted Customer Global Key ($E_{PPK}[CGK]$) 459 | Flash | CE Source 108 in field |
| Secret Value 2 (SV2) Key 451 | OTP | CE Source 108 in field |
| Product ID (PID) 600 | OTP | SP 102 by black box 116 |
| JTAG unlock key | OTP | SP 102 by black box 116 |

Table II shows what keys and data fields in a particular CE device 112 are fixed (do not change) after a new software image containing an alternate conditional access vendor application has been downloaded and authenticated by the chip 114.

TABLE II

Fixed key and data fields when accepting a new software image for an alternate conditional access vendor application
Fixed Keys/Security Fields for all downloaded images used in the CE Device 112

SP Public RSA key (stored in ROM or OTP) (block 200)
SV, $SV_{CA2}$, $SV_{CA3}$, $SV_{CA4}$, . . . (programmed by black box) 451
$E_{SV}[PPK]$ 455
PID 600
JTAG The PID 600 is a public identifier and can be freely shared with any third party. The PPK 453 is kept private to the security provider 106 and is never released to any third party and/or CE Source 108 (an encrypted version of the $E_{SV}[PPK]$ 455 is stored in the chip 114, via the black box 116 as is the secret value (SV) 451 needed to decrypt the $E_{SV}[PPK]$ 455). The JTAG value is only provided if the CE device 112 experiences an in field failure. Table II also shows different values of the SV key 451. The first value SV 451 is the value programmed by the security provider 106 via the black box 116 and is allocated to the individual CE source 108 and/or CA vendors 108B as the CE source 108 or CA vendor 108B requires as a part of its conditional access system to secure content distribution. $SV_{CA2}$ is distinguished from SV2 451, which can be optionally programmed by the black box 116). Hence, if multiple SVs 451 are programmed by the service provider 102 via the black box 116 and distributed to the field, the service provider 102 may later elect to provide one or more of these SVs 451 (e.g. SV) to an individual CA vendor 108B when the CE device 112 is first used in the field or the service provider 102 can chose to save one or more SVs 451 ($SV_{CA2}$, $SV_{CA3}$, $SV_{CA4}$ . . . ) for a subsequent CA vendor 108B switch for the fielded CE device 112 at a later time.

The downloaded STB image contains the switchable keys from Table III, i.e. the initial image loaded in the STB flash contains CA Vendor key set 0 as defined below:

Cust Pub RSA Key0
Hash0
Signed Hash0
Cust Sig0
$E_{PPK}$[CGK0]

CA switch means that the new STB flash for the new STB application contains an image that has values for CA Vendor key set 1. The Code Signing verification routine needs to reference these fields from the STB flash image.

Table III shows the new key and data fields that utilized when a new CE device image implements a switch from one CA vendor 108B to another CA vendor 108B.

CA vendor 108B or different conditional access system. Upon a successful download and a CE device 112 reboot, the new CE device 112 application flash image 716 is authenticated with the new signed Third Party RSA key 210, new CPD (202), and new CA vendor 108B application 716 as shown in FIG. 3.

This enables the new CA vendor 108B application to take control of the CE device 112 and provide content protection services for the service provider 102 with the conditional access system new CA vendor 108B.

An existing CE vendor's 108B conditional access data can also be revoked. This is made possible by incorporating the CPD 202 into the signed hash 210 to enable the CE source 108 to revoke a previously assigned CE source 108 public RSA key 201. In this embodiment, the CE Source 108 provides a new public RSA key 201 to the security provider 106. The security provider 106 assigns a new CPD 202 to be

TABLE III

New Key and Data Fields Utilized in a CE Device After a Switch to a Different CA Vendor 108B or Different Conditional Access System

| Keys/Security Fields contained in the initial image loaded into the CE Device at Manufacturing | Downloadable Keys/ Security Fields modified in first CA provider switch image delivered to the fielded CE Device | Downloadable Keys/ Security Fields modified in second CA provider switch image delivered to the fielded CE Device | Downloadable Keys/Security Fields modified in third CA provider switch image delivered to the fielded CE Device |
| --- | --- | --- | --- |
| SV1 | SV2 | SV3 | SV4 |
| Cust Pub RSA Key0 (201) | Cust Pub RSA Key1 (201) | Cust Pub RSA Key2 (201) | Cust Pub RSA Key3 (201) |
| CPD0 (202) | CPD1 (202) | CPD2 (202) | CPD3 (202) |
| Hash0 | Hash1 | Hash2 | Hash3 |
| Signed Hash0 (210) | Signed Hash1 (210) | Signed Hash2 (210) | Signed Hash3 (210) |
| Cust Sig0 (218) | Cust Sig1 (218) | Cust Sig2 (218) | Cust Sig3 (218) |
| $E_{PPK}$[CGK0] (459) | $E_{PPK}$[CGK1] (459) | $E_{PPK}$[CGK2] (459) | $E_{PPK}$[CGK3] (459) |

Each CA vendor 108B switch results in the installation and use of a new Customer Public RSA key 201 (i.e. Cust Pub RSA Key1, Cust Pub RSA Key2, Cust Pub RSA Key3 in the Table III). The security provider 106 assigns each new CA vendor 108B a unique CPD 202 (i.e. CPD1, CPD2, CPD3 in Table III). The security provider 106 hashes the Customer Public RSA key 201 and CPD 202 producing unique hash values and signs each new hash with the security providers 106 own Private key as requested by the service provider 102. (i.e. Signed Hash1, Signed Hash2, Signed Hash3 in Table III). To optionally further increase security, the address location for the flash-based third-party public RSA key 201 and/or the CPD 202 can also be used fix input data for a given CE source 108 and incorporated into the signed hash block 210. The secret values (SVs) 451 programmed by the black box 116 during SOC manufacturing are allocated as determined by the service provider/broadcaster 102 or CE device 112 owner. In Table III a different SV value 451 is allocated to the CA vendor 108B after a switch is performed.

The security provider 106 also assigns a new CGK 456 and generates the $E_{PPK}$[CGK] 459 for each switch to a new used with the new public RSA key 201, with the new CPD 202 to be stored at the same address as the CPD 202 currently stored and used with the existing public RSA key 201. If the replaced CPD 202 was stored in OTP, then a few bits of the new CPD 202 may be changed so that the physical address of the CPD 202 does not change. The security provider 106 returns a new signed hash 210 for the new CE source public RSA key 201 and new CPD 202. The CE source 108 transmits a new software image 716 to the CE device 112 (for example, by wireless means). The previously signed CE source public RSA 201 key will no longer be successfully validated by the security provider's signed hash 210 since the signed hash uses old CPD 202 value, which will no longer pass the verification process in blocks 304-312 of FIG. 3 since the CPD 202 value has changed, thereby, revoking the signed hash and previous CE source public RSA key 201 in the CE Device 112. The previous CE source public RSA key 201 could be used once again if the security provider source provides another signed hash 210 using the old CE source public RSA key, old CPD value 202 with a new CPD address since the CPD value 202 at the old CPD address location has been changed.

TABLE IV

| Keys/Security Fields allocated to CA Vendor 1 loaded into the CE Device at Manufacturing | Keys/Security Fields allocated to CA Vendor 2 loaded into the CE Device at Manufacturing |
|---|---|
| Cust Pub RSA Key0 201 | Cust Pub RSA Key0 201 |
| CPD0 202 | CPD0 202 |
| Hash0 | Hash0 |
| Signed Hash0 210 | Signed Hash0 210 |
| Cust Sig0 218 | Cust Sig0 218 |
| SV1 451 | SV2 451 |
| $E_{PPK}$[CGK1] 459 | $E_{PPK}$[CGK2] 459 |

Table IV shows a provisioning example where two CA vendors 108B can coexist in the same CE device. A common Customer private RSA key signs the final CE Device binary image containing the production code 716. The CE Device 112 would verify the signature using the Cust Pub RSA Key0 shown in 708 contained in the image 716 loaded during CE Device manufacturing or sent over the air. In this case the Customer who holds/generated the code signing RSA key 201 would be the CE Device 112 owner who is responsible for the overall operation of the STB or CE Device and the Co-existence of both CA vendors 108B in the field. The CE device 112 owner would be responsible for receiving the final binary images from the two CA vendors 108B and making sure that the applications 716 perform properly together. Each CA vendor 108B maintains its own Secret Value key 451 (SV1 and SV2 respectively) programmed by the black box 116 during SOC manufacturing that protects content related items such as Control Words and subscription entitlements. Each CA vendor 108B also is provided with its own Customer Global Key 202 (CGK1 and CGK2 respectively) that is used to protect sensitive code and CE Device data contained in the application code image 716. CA Co-Existence works in a single CE Device 112 because each CA vendor's 108B content protection mechanism is cryptographically protected and isolated against the other through the allocation of independent key sets (SV1/$E_{PPK}$[CGK1] and SV2/$E_{PPK}$[CGK2] respectively) programmed by the black box 116. The CA vendor 108B designs their unique content protection and distribution architecture based on these root keys resident in the CE device 112. Since the root key sets shown in Table IV are unique and separate for each CA vendor 108B, encrypted subscription entitlements and control words can be delivered uniquely to the CE Device 112 without fear of them being manipulated or falsely created by the other CA vendor 108B.

Chip Ownership Validation Code for JTAG Unlock Value

In one embodiment, service provider 102 uses a key to protect a Joint Test Action Group (JTAG) port on the chip that is used to obtain access to higher security areas of the chip 114 (e.g. the chip's internal states). The value for this key can be programmed by the black box 116 during chip 114 manufacturing. In one embodiment, the key is a 128-bit JTAG key. The JTAG key should be a 128-bit value. Smaller values JTAG key lengths are acceptable if there is a delay function between successive password unlock attempts. For adequate security, the key length should be at least 64 bits in length. Access to the JTAG port is gained when the password is supplied. This key cannot be exported to software.

Figure 8A:
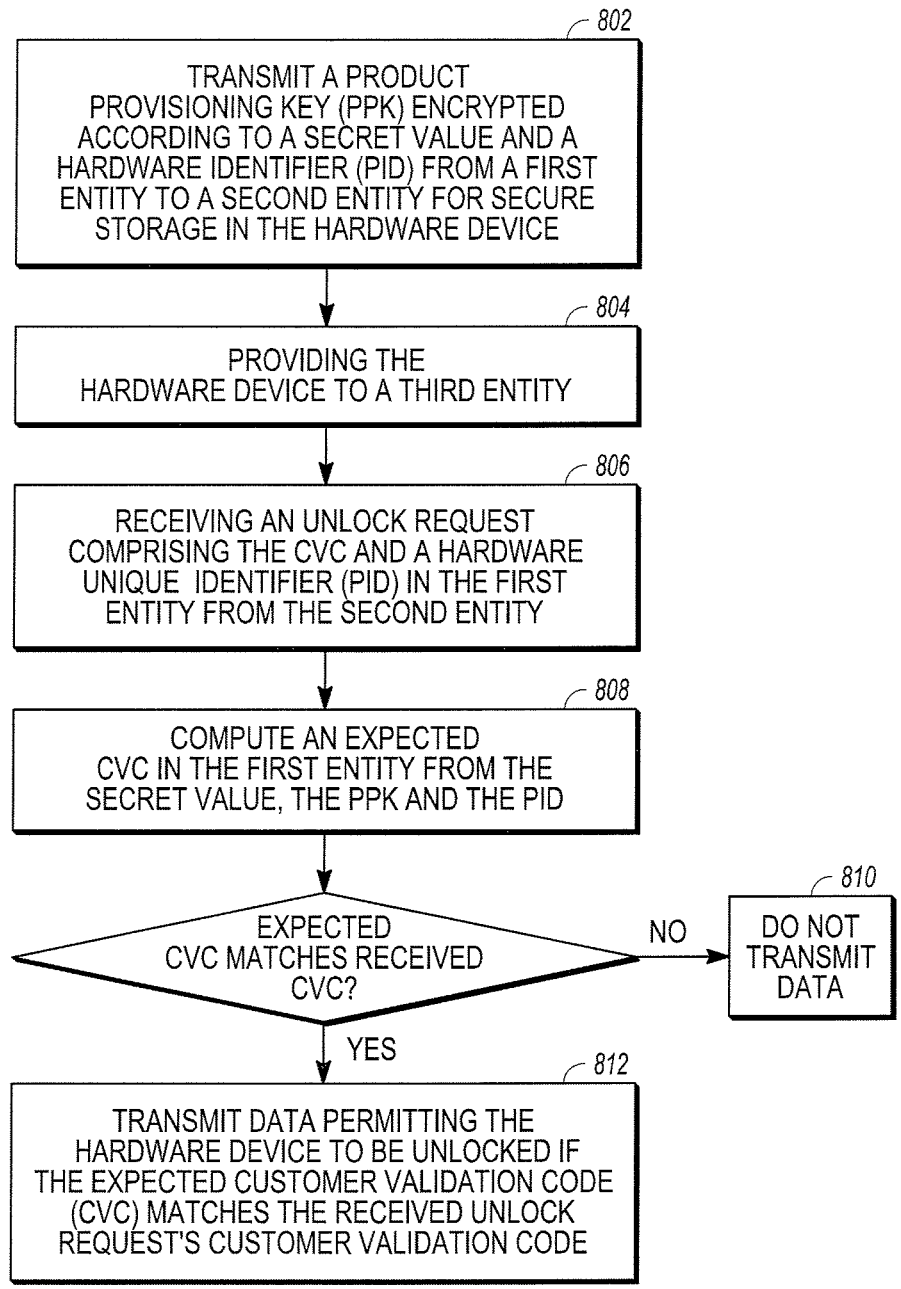
FIG. 8A is a diagram illustrating exemplary method steps that can be used to deliver the unlocking data.

FIG. 8A is a diagram presenting exemplary method steps that can be used as a method for a first entity (service provider 106) to deliver JTAG data to unlock the hardware device or chip 114 to a second entity (CE source 108). The chip 114 ownership by the second entity can be verified by the first entity if the second entity delivers an authentication value produced uniquely for each chip 114 as recoded during the manufacturing process. There are numerous methods that can be employed several of which are identified here.

FIG. 8A is a diagram illustrating exemplary method steps that can be used to deliver the unlocking data. As shown in block 802, a product provisioning key that has been encrypted with the chip 114 unique secret value SV 451 is transmitted from the first entity (the service provider 102) to the second entity (CE source 108) for secure storage in the chip 114. In one embodiment, this is accomplished via the Black box 116. A chip 114 PID 600 is also stored in the chip 114. The chip is provided to the CE Source, which installs the chip 114 in a CE device 112, and provides the CE device 112 with the chip 114 to third parties, such as end users, as shown in block 804. When the CE device wishes to unlock the hardware chip using JTAG or similar data, the CE source 108 and transmits, and the service provider 102 receives an unlock request, as shown in block 806. The unlock request comprises a customer validation code CVC 862 that is computed by the chip 114 and reproducible in the service provider 106 as well as chip 114 identifying information such as the PID 600. In one embodiment, the CVC 862 computed in the hardware device from the encrypted product provisioning key $E_{SV}$[PPK] alone or with an additional seed. In other embodiments, the CVC 862 is also computed using the CE source 108 unique customer product differentiator (CPD 202), the chip 114 unique PID 600. The service provider 102 receives the unlock request having the CVC 862 and PID 600, and computes an expected CVC 862 from the secret value SV 451, and CPD/PID/PPK as required, as shown in block 808. The resulting expected CVC 862 is compared to the CVC 862 received from the CE source 108 in the unlock request, and if the two values match, the service provider 102 transmits the requested JTAG data to the CE Source 108. The CE Source can then use that data to unlock the chip 114 as desired.

Figure 8B:
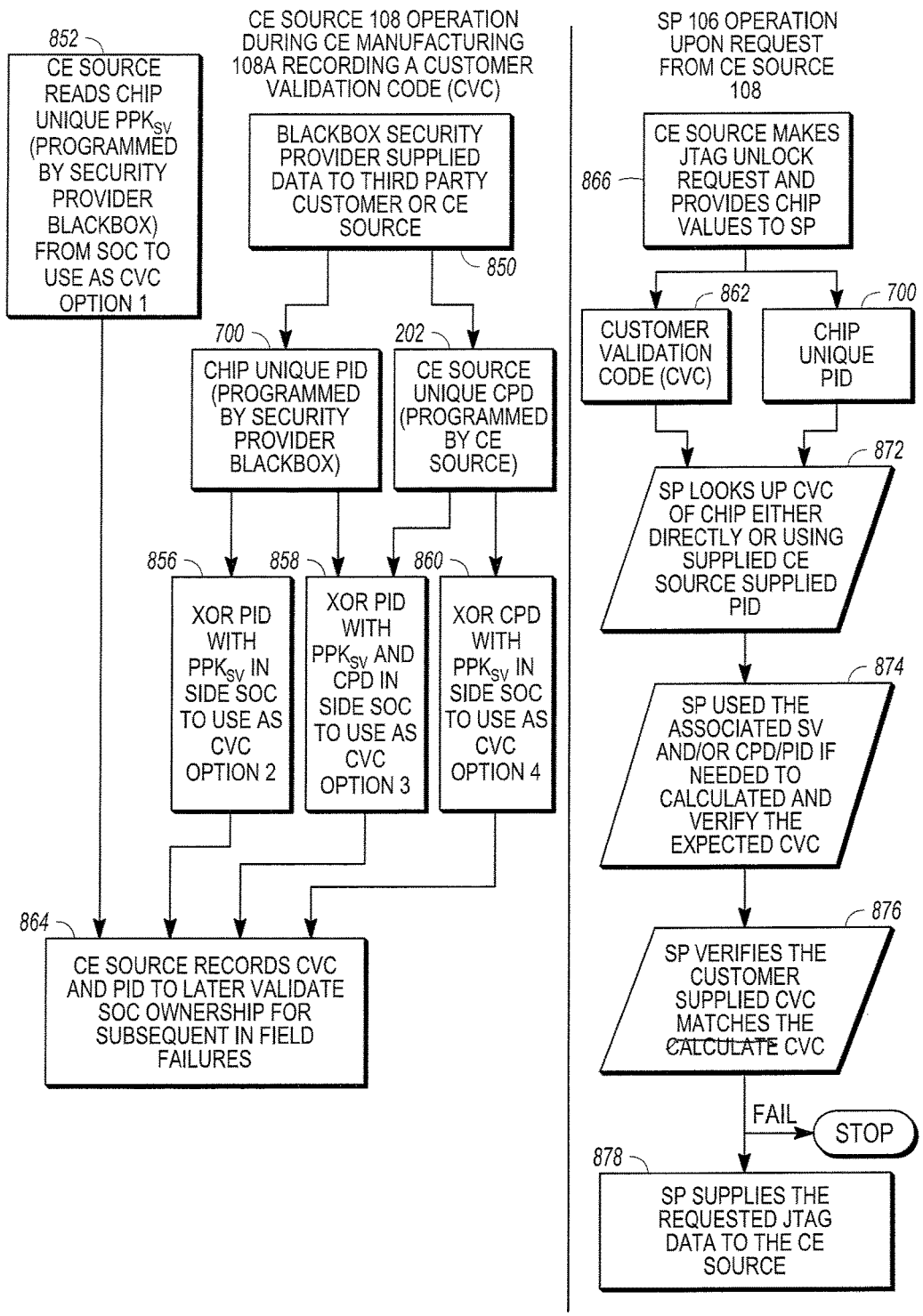
FIG. 8B illustrates a more specific example of the calculation and distribution of customer validation data by the CE source 108 after the chip 114 is manufactured.

FIG. 8B illustrates a more specific example of the calculation and distribution of customer validation data by the CE source 108 after the chip 114 is manufactured. The service provider 102 can implement a chip 114 ownership validation scheme that the CE source 108 or subscriber 110 can use to prove ownership of the CE device 112 before the service provider 102 releases a JTAG key to a requesting party. The CE source 108 participates in the generation of validation codes when the chip 114 is produced.

First, the consumer validation code (CVC 862) must be determined. This can be accomplished in a number of ways.

First, since the $E_{SV}$[PPK] 455 itself us unique, it can be used as the consumer validation code CVC 862, as shown in block 852.

Alternatively, the CVC 862 may be computed inside the chip 114 from different combinations of $E_{SV}$[PPK], the chip PID 600, the unique customer product differentiator CPD 202, and a seed provided by the service provider 102. For example, the CVC 862 can be computed as an XOR of the PID 600 and $E_{SV}$[PPK] 455, as shown in block 856, as an XOR of the PID 600, the $E_{SV}$[PPK] 455, and the CPD 202, as shown in block 858, or as an XOR of the CPD 202 and the $E_{SV}$[PPK] 455, as shown in block 860. All of these CVC 862 calculations are unique to the chip 114, SV 451 and globally unique PID 600, which could only be have been produced by a single chip 114 of the entire population of fielded chips 114. The CVC 862 (alternatively referred to hereinafter as the hash validation code) and optionally the PID 600 are recorded as shown in block 864 for later use in validating chip 114 or CE device 112 ownership.

The service provider 102 needs to be able to validate third party owner of the CE device before the JTAG unlock key can be release to a third party customer (e.g. CE source 108). The third party customer such as the CE source 108 transmits a JTAG unlock request 866 to the service provider 102. The request includes the CVC 862 862 and PID 600 for the chip 114 for which they require a JTAG unlock key. The service provider 102 looks up the SV 451 of the chip 114 using the PID 600 supplied by the third party customer. The service provider 102 uses the SV 451 and the PID/CPD to calculate the expected CVC 862, as shown in blocks 872 and 874. The service provider 102 verifies that the customer supplied CVC 862 matches the calculated expected CVC 862 to determine if they are the legitimate third party owner of the chip 114. If so, the JTAG data needed to unlock the chip 114 is transmitted to the third party customer, as shown in block 878.

Signaling for CAS Switching and Key Derivation

It is desirable for service providers to have the capability to segment a population of CE devices 112 (hereinafter alternatively referred to as client devices 112) into a number of different groups based on CAS switching requirements. For example, a service provider may want client devices 112 of a particular generation to switch to a second CA system based upon a discovered vulnerability discovered in that particular generation of client device 112. It is especially desirable that this capability include fielded devices that are already deployed in consumer locations. This fluid ability to define and redefine groups of fielded devices allows different CAS switching paradigms to be defined, including CAS switching that occurs slowly throughout the fielded client device 112 population.

Described below is a CAS switching paradigm and a method for signaling such switching that permits groups of fielded client devices 112 to be defined and redefined as necessary, and provides a technique for signaling when and how such CAS switching should take place. In the embodiment described below, the client device 112 has previously received an appropriate application image containing a current CAS application that will be switched out and a new CAS application that will be switched in to replace the current CAS application. In this process, the CAS switching process is guided by the vendor of the middleware executing on the client device 112 (for example, the CA vendor 108B), and no direct support is required from the CAS application itself. Typically, the CAS client runs in the client device 112 on a security processor separate and peripheral from the primary CPU of the client device 112 or a trusted execution environment (TEE), while the middleware typically executes on the same CPU used for the primary CAS application.

In one embodiment, the CAS signaling and switching is performed on a client device 112 compliant with the digital video broadcasting (DVB) specifications, including "Digital Video Broadcasting (DVB): Implementation Guidelines of the DVB Simulcrypt Standard, ETSI TR 102 035, Version 1.1.1, published 2002 by the European Telecommunications Standards Institute; "Digital Video Broadcasting (DVB): Head-end implementation of DVB SimulCrypt," ESTI TS 103 197, Version 1.5.1, published 2008 by the European Telecommunications Standards Institute; and "Common Interface Specification for Conditional Access and Other Digital Video Broadcasting Decoder Applications," EN 50221, published February 1977 by the Technical Committee CENELEC TC 206, all of which are hereby incorporated by reference herein. In this instance, the CAS switching process involves the Application Specific Data (ASD), which is defined in the Digital Video Broadcasting (DVB) specifications as Private Data (PD). CAS switching data is inserted by the service provider 102 (hereinafter alternatively referred to as the headend 102) into the content delivery network (CDN) for delivery to the selected client devices 112. This data is received and processed by the middleware in the client device 112 to use the appropriate CAS application as directed by the signaling mechanism described herein.

This process allows the operator of a service provider or headend 102 (COMCAST, DIRECTV, DISHTV, or ECHOSTAR, for example) to set up groups in the client device 112 population as they see fit at the time they intend to perform a switch away from the existing CAS vendor 108B to a new CAS vendor 108B whose application resides in the device. A CAS switch may be desirable in the event the exiting CAS system has been hacked, due to an expiring business relationship with the existing CAS, or more favorable business terms and/or features are available in a new CAS.

The CAS data is passed to each defined group of client devices 112 through the middleware based on the ASD. The new CAS is signaled to the middleware by a message sent from the headend 102 indicating that the middleware should begin using the new CAS. The individual SoC 114 in each client device 112 may require a reboot if required or needed to properly configure the data and key handling resources in the SoC 114. Specific SoCs 114 may be utilizing a derived key mechanism (defined below), which means that the key ladder responsible for calculating the control words used to decrypt encrypted video packets must be properly configured in the SoC 114 for a given CAS client.

The Private Data Generator (PDG) described in the DVB standard closely resembles an entitlement management message (EMM) generator, receives and processed the ASD. This implementation is independent of the CA vendor 108B of the CAS, so it is not necessary to discuss details of the CAS switching implementation or process with individual CAS vendors 108B. The CAS switch is independent of the CAS client itself as it is guided by state in the middleware implemented in the client device 112. After a switch, entitlements are delivered to the new CAS client (i.e. CAS application for the new operational CAS in the client device) for it to properly provide the subscriber with access to their paid/subscribed programming.

Typically, a CAS switch is performed during off peak viewing hours to minimize disruption in the subscriber/viewing population. However, since the switch command is a part of the same signal that delivers the content itself, a switch from one CAS to another will not occur if the client device 112 is not receiving the content delivery signal at the time a CAS switch is requested by the headend 102. Consequently, a second or third attempt to complete the CAS switch may be required before the switch actually takes place. Messages to the middleware could be repeated in a carousel fashion (similar to how electronic program guides (EPGs) are currently distributed), and contain a date/time to perform the actual switch/reboot. That increases the likelihood that all client devices 112 in the group perform the switch command at the same time, irrespective of when each client device 112 may have been tuned to the receive the content delivery signal.

DVB Definitions

The DVB standard defines a program association table (PAT) and a conditional access table (CAT). Both the PAT and the CAT are associated with DVB program identifiers (PIDs) that identify each program in a data stream that may comprise multiple programs. The data stream may also comprise multiple independent program map table (PMT) sections. Each PMT section is given a unique user-defined PID and maps a program number to the metadata describing the program and the program streams.

The PIDs associated with each PMT section are defined in the PAT, and are the only PIDs defined there. The streams themselves are contained in packetized elementary stream (PES) packets with user-defined PIDs specified in the PMT. The PMT is comprised of sections for each program_number represented in a transport stream, each section of which contains the packet identifier and characteristics of each elementary stream in the program service. The CAT is used for conditional access management of the cypher keys used for decryption of restricted streams. The CAT table contains privately defined descriptors of the system used and the PID of the EMM associated with that system. It is used by a network provider to maintain regular key updates.

Figure 9:
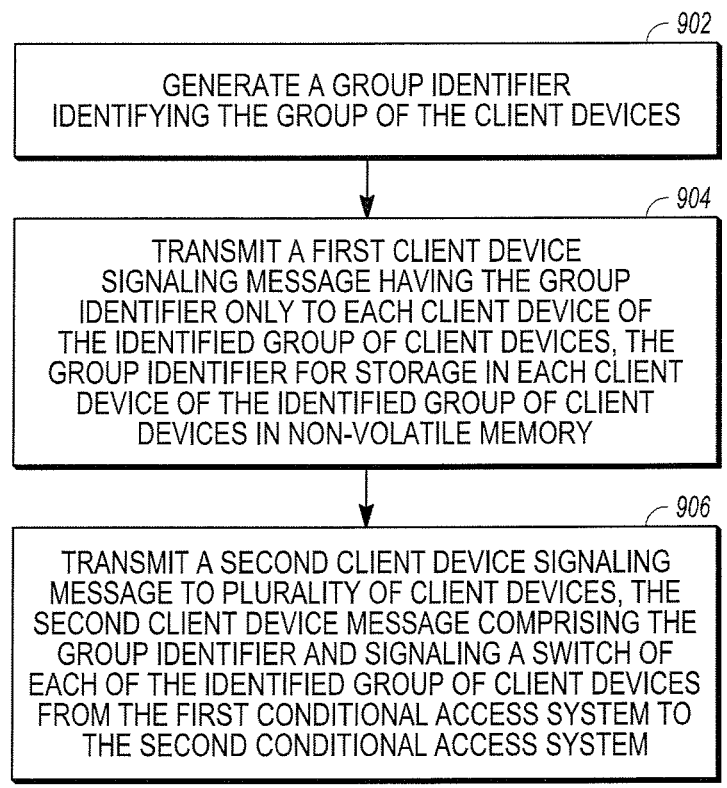
FIG. 9 is a diagram illustrating exemplary method steps for controlling a group of client devices to switch from a first CAS to a second CAS via a plurality of client device signaling messages.

FIG. 9 is a diagram illustrating exemplary method steps for controlling a group of client devices 112 to switch from a first CAS to a second CAS via a plurality of client device signaling messages. As described below, the client device signaling messages each comprise at least one of a plurality of action codes and payload data.

In block 902, a group identifier that identifies the group of client devices 112 is generated. In block 904, a first client device signaling message is transmitted to only each client of the identified group of client devices 112 (the first client device signaling message is not transmitted to client devices 112 that are not in the identified group). The first client device signaling message includes the group identifier. The group identifier is for storage in a non-volatile memory of each client device 112 of the group of client devices 112.

In block 906, a second client device signaling message is transmitted to the plurality of client devices 112 (which may include client devices 112 that are not in the identified group). The second client device signaling message includes the group identifier and signals a switch of each of the group of client devices 112 from the first conditional access system to the second conditional access system.

In one embodiment, each of the plurality of devices comprises a middleware module, and the first client device message and the second client device message are transmitted on a conditional access switching message channel monitored by the middleware module of each of the plurality of devices. In this case, an identifier of the conditional access switching message channel (e.g. a switching message PID) is transmitted to each of the plurality of devices, for example, in a conditional access table.

Figure 10:
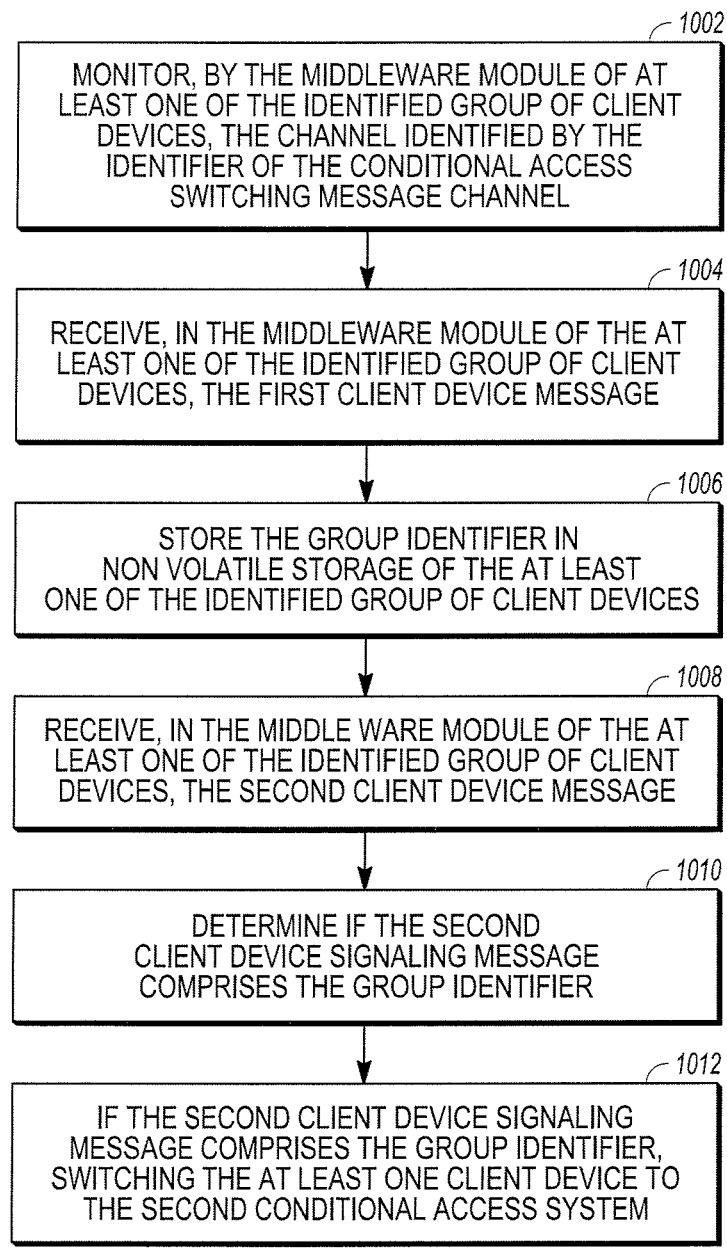
FIG. 10 is a diagram illustrating exemplary operations performed by the client devices in receiving and handling the first client device message and the second client device message.

FIG. 10 is a diagram illustrating exemplary operations performed by the client devices 112 in receiving and handling the first client device message and the second client device message. In block 1002, a middleware module of at least one client device 112 of the group of client devices 112 monitors a channel identified by the identifier of the conditional access switching message channel. In block 1004, the middleware module of the at least one of the client devices 112 receives the first client device message transmitted in block 904 (which includes the group identifier). In block 1006, the group identifier is stored in non-volatile memory of the at least one of the client devices 112. The middleware of the client devices 112 continue to monitor the conditional access switching message channel, and in block 1008, the middleware module of the at least one of the group of client devices 112 receives the second client device message. Block 1010 determines whether the second client device signaling message comprises the group identifier received and stored in blocks 1004 and 1006. If so, the at least one client device 112 switches from the first conditional access system to the second conditional access system, as shown in block 1012.

Figure 11:
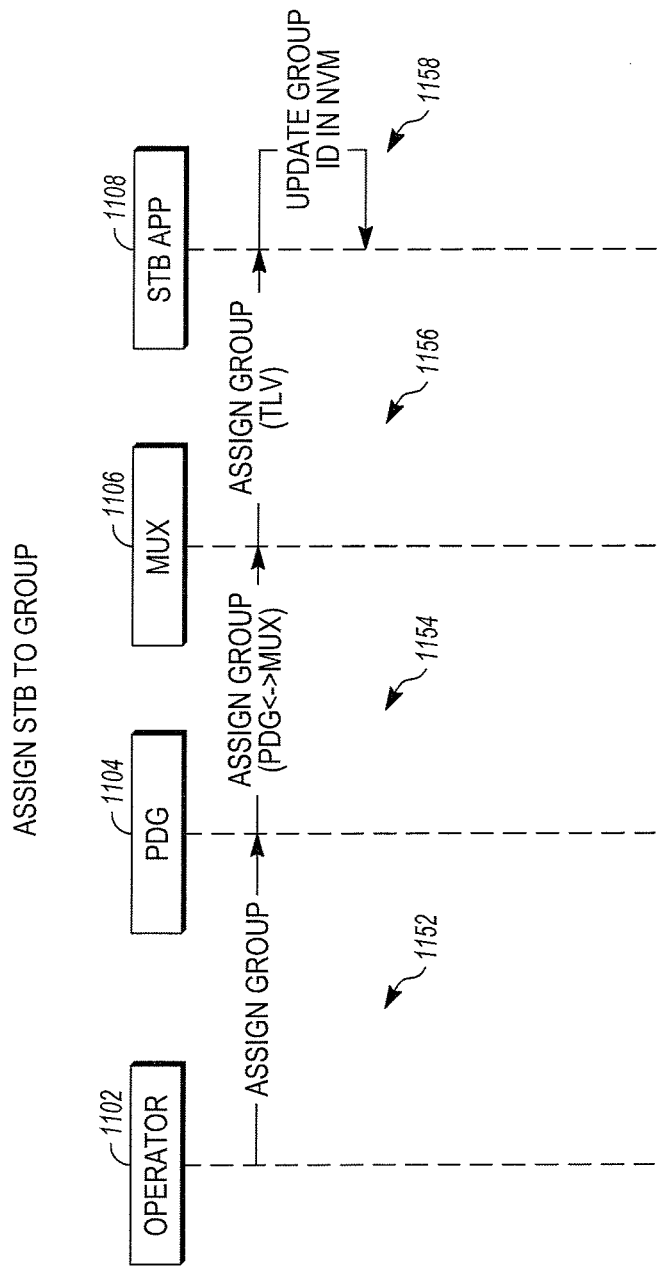
FIGS. 11-12 illustrate the operations presented in FIGS. 9-10 in greater detail.
Figure 12:
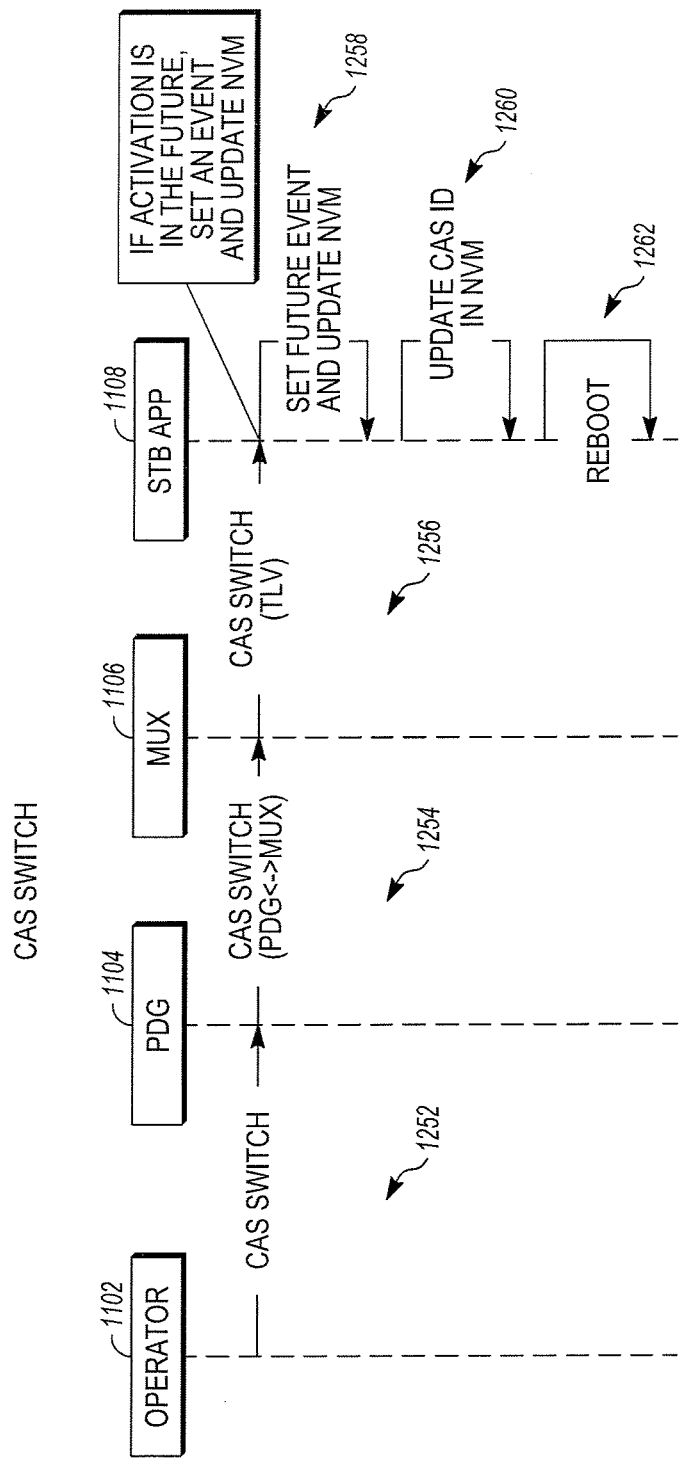

FIGS. 11-12 illustrate the operations presented in FIGS. 9-10 in greater detail.

Assigning a Client Device to a Group

FIG. 11 illustrates operations that may be performed to assign a client device 112 to a group. This illustrates additional detail regarding the operations illustrated in blocks 902 and 904 of FIG. 9 and blocks 1002-1006 of FIG. 10.

Client devices 112 are assigned to a particular group upon activation via a group identifier stored in non volatile memory (NVM). The group identifier allows a subset of the client device 112 population to switch to another CAS system stored in the client device, but dormant (e.g. not installed and operating). This group assignment by provision of the group identifier is in addition to the other actions that may be required by the CAS currently active in the client device. Then an application executing on the client device 112 updates the group identifier by storing it in NVM upon reception of a message having an Assign Group Action.

As shown in 1152, an operator 1102 issues an assign group command to the private generator or PDG 1104. The operator 1102 may comprise a human or a computer executing instructions to generate the command based on input from humans or another computer. As shown in 1154, the PDG 1104 generates private data comprising a group identifier, and provides this identifier to a multiplexer 1106 which multiplexes the private data having the group identifier into the data stream transmitted to the client device. The private data is then transmitted in a data stream to the client device 112 where it is accepted by the client device 112 (set top box or STB) application 1108, as shown in 1156. The client device 112 then updates the group identifier of the client device 112 by storing the received group identifier in non-volatile memory (NVM) as shown in 1158.

FIG. 12 illustrates operations that may be performed to initiate a CAS switch. This illustrates additional detail regarding the operations illustrated in blocks 906 of FIG. 9 and blocks 1008-1012 of FIG. 10.

A CAS switch is initiated by a Switch CAS message generated by the PDG. The Switch CAS messages can be addressed to one or more individual client devices 112, a group of client devices 112 or all client devices 112. This paradigm permits a single message to be sent to all client device 112 members in the group as opposed to sending many single, independent messages to individual client devices 112. The Switch CAS message may include an activation date to allow pushing of the message before the CAS switch is to actually take place. In such cases where the activation date/time is in the future, the STB application 1108 executing in the client device 112 sets an event and writes the CAS ID to a NVM memory location for future use by the CAS Switch activation event. When the activation event occurs (in the future or immediately), the STB application 1108 writes the CAS ID to a well-known location memory location in NVM (that is designated to be executed on reboot) and reboots. On reboot, the STB application 1108 reads the CAS ID and activate the corresponding CAS kernel to install and execute the new CAS.

Referring to FIG. 11, the operator 1102 selects which group of the client devices 112 are desired for a CAS switch, an identifier of the CAS to be switched to (CAS ID) and issues a CAS switch command identifying these devices and providing the CAS ID, as shown in 1202. In 1204, the PDG generates private data comprising the group number of the group of client devices 112 for which the CAS switch was desired, and provides that PDG to the multiplexer 1106, which multiplexes the private data having the group identifier and information indicating that a switch is desired into the data stream as a CAS switch command. The private data is then transmitted in a data stream to the client device 112 where it is accepted by the client device application 1108, as shown in 1208. As described further below the CAS switch may be performed immediately upon receipt by the client device, or may be performed as a future event. In cases that the update is to occur immediate, the CAS ID is updated in NVM, and the client device 112 is rebooted as shown in 1210 and 1212. In cases where the update is to occur at a later time or date, the CAS ID is updated in NVM, and a future event is set, at which time the CAS switch will take place by rebooting 1212 the client device.

Client Device Operations to Perform CAS Switch

As a part of the booting process, middleware executing on the client device 112 checks the known flash location (designated to be executed on reboot) to determine which CAS to initialize. This information was included in the form of the CAS ID (for example, CAS-A, CAS-B or CAS-C) transmitted with the CAS Switch message described above. Next, the middleware executing on the client device 112 provides CAS specific data to a secure processor of the client device 112 (e.g. a SoC 114 or system on a chip) so that the SoC 114 can derive keys associated with the selected CAS and pertaining to the appropriate CAS vendor 108B. Such keys may include, for example keys or intermediate results required to derive keys for decrypting media programs encrypted by the headend 102.

Next, the middleware executing on the client device 112 initializes the appropriate CAS, which then operates as a CAS client. The middleware monitors the appropriate channel to receive the CAT from the headend 102, and once the CAT is received, the middleware passes the CAT to the CAS client.

Using the CAT, the CAS client instructs the middleware to monitor the appropriate channel to receive EMMs. The appropriate channel can be defined according to a particular DVB PID, which may be placed in the CAT with a "dummy" CAS identifier. For example, in a DVB system, the PID used for EMM reception may be monitored.

When the client device 112 is tuned to the appropriate channel, the middleware receives the PMT and parses the PMT to determine the PID of the ECMs that correspond to the CAS currently in operation (e.g. the CAS recently switched to). The middleware then filters the incoming data stream for ECMs having the determined PID, and passes those ECMs to the CAS client. The CAS client (cooperating with the middleware if necessary) then process the ECM to load decrypting information such as keys and/or software, and uses that information to generate keys or other information that is needed to decrypt media program(s).

Message Definitions

This section provides an exemplary format and syntax of the messages communicated with the client device. It is noted that message of differing format and/or syntax may be used. In a preferred embodiment, the messages themselves are cryptographically protected, either through encryption, hashing or other means. Messages communicated with the middle ware include (1) an address (intended target of message, such as global, group, specific), (2) a sequence number (to prevent duplicate processing), (3) a message type, and (4) payload. Message types include but are not limited to (1) Assign group, (2) Assign CAS Vendor 108B, and (3) Reboot. Payloads are specific to a particular message type, as further described below. Based on message type, middleware will take appropriate action (i.e. store group info in flash, store selected CAS vendor 108B in flash, reboot at the appropriate time).

Message include an action code, describing a particular action that the message is to command. In the example below, actions are embedded in the message in a tag-length-value (TLV) format.

Action Table

Table V defines one embodiment of a minimal list of Actions to implement for CAS Switching messages.

TABLE V

| Action (Hex) | Description | Comments |
| --- | --- | --- |
| 01 | Sequence number | Sequence number of the message |
| 02 | Timestamp | Timestamp of the message in system time |
| 10 | Unique Addressing | Unique address of STB |
| 11 | Group Addressing | Group address of STB |
| 12 | Global Addressing | All STB's |
| 20 | Assign Group | Assign a STB to an addressing Group |
| 21 | CAS Switch | Switch from current CAS to CAS identified in the message |

Each message minimally requires the following Actions (1) Addressing (unique, group, or global) (2) Timestamp (3) Sequence number (4) Primary action (Assign Group or CAS Switch).

The Sequence Number action (01) is used communicate the sequence number of the message to the STB Application 1108. This information prevents the STB application 1108 from reprocessing messages. Data associated with this action is presented in Table VI.

TABLE VI

| Field | Size | Description |
| --- | --- | --- |
| Action Code | 1 | 01 - Sequence Number |
| Length | 1 | Length (does not include action or length fields) |
| Sequence Number | 2 | Sequence number |

The Timestamp action (02) is used to indicate system time. Messages with Timestamps in the past should not be processed. Data associated with this action is presented in Table VII.

TABLE VII

| Field | Size | Description |
| --- | --- | --- |
| Action Code | 1 | 02 - Timestamp |
| Length | 1 | Length (does not include action or length fields) |
| Time | Var | User defined time |

The Unique Addressing action (10) is used to address a single client device. Data associated with this action is presented in Table VIII.

TABLE VIII

| Field | Size | Description |
| --- | --- | --- |
| Action Code | 1 | 10 - Addressing Unique |
| Length | 1 | Length (not including action and length fields) |
| Address | var | The unique address of the STB (Transport Chip ID) |

The Group Addressing (11) action is used to address a group of client devices 112 assigned to a Group Identifier. Data associated with this action is presented in Table IX.

TABLE IX

| Field | Size | Description |
| --- | --- | --- |
| Action Code | 1 | 11 - Addressing Group |
| Length | 1 | Length (not including action and length fields) |
| Group ID | 2 | The Group Identifier |

The Global Addressing (12) action is used to address all client devices 112. Data associated with this action is presented in Table X.

TABLE X

| Field | Size | Description |
| --- | --- | --- |
| Action Code | 1 | 12 - Addressing Global |
| Length | 1 | Length (not including action and length fields) Shall be 0 |

The Assign Group (20) action is used to assign a STB to a Group Identifier. Data associated with this action is presented in Table XI.

TABLE XI

| Field | Size | Description |
| --- | --- | --- |
| Action Code | 1 | 20 - Assign Group |
| Length | 1 | Length (not including action and length fields) |
| Group ID | 2 | The Group Identifier |

The CAS Switch (21) action is used to signal a CAS Switch. Data associated with this action is presented in Table XII.

TABLE XII

| Field | Size | Description |
| --- | --- | --- |
| Action Code | 1 | 21 - CAS Switch |
| Length | 1 | Length (not including action and length fields) |
| CAS ID | 4 | CAS ID to switch to |
| Activation Time Length | 1 | The length of the Activation Time to follow |

TABLE XII-continued

| Field | Size | Description |
| --- | --- | --- |
| Activation Time | var | The time at which the CAS Switch should occur. There may be an encoding of 'Now,' meaning perform CAS Switch immediately on reception. |

The system and method described above permits programming of unique secrets into the SoC 114 at the SoC 114 manufacturing site 104 and permits later allocation of these SoCs 114 to any one of a number of potential CE device manufacturers 108A and many independent CAS/DRM vendors 108B. SoC 114 programming can also occur at the packaging or product manufacturing facility by execution of an in-field programming sequence on the SoC 114.

In traditional broadcast and cable system, content is offered to subscribers within the content distribution ecosystem directly from the service provider, i.e. satellite or cable provider. In some embodiments, a Hardware Root of Trust Security is offered for high value content with easy integration with a CAS and DRM technology to enable many content providers to provide their media programs directly to consumers using their CE devices. In both models (i.e. traditional broadcast model versus the content provider direct model) of content distribution, a security provider independent architecture can support multiple concurrent or serial CAS and DRM implementations using a single black box programming security platform with limited One Time Programming (OTP) resources to store secrets representing the hardware root of trust. This security architecture implementation provides a means for instantaneous switching between security profiles offered by different and independent CAS and DRM security providers.

In a derived key SoC architecture providing security providers with different security key debases is accomplished by allowing SoCs 114 to use black box OTP resources as the basis to derive security keys to enable different security schemes by altering the key generation inputs based on digital rights management (DRM) and CAS vendor 108B software and possibly CA vendor 108B unique OTP inputs. The key generation inputs can be provided in the CAS and DRM application that could be loaded at CE device manufacturing or downloaded over the air for fielded CE device(s).

Key derivation can be accomplished in a number of ways, for example, by taking the black box programmed secret OTP keys, CAS/DRM vendor 108B software input and possible CAS/DRM vendor 108B unique OTP values and combining in a series of crypto graphic calculations using AES, DES or Triple DES. Where the black box programmed secret OTP keys are used as the key and the software input and CAS/DRM vendor 108B unique OTP values are the data in the cryptographic operation. Such operations are standard for those skilled in use and construction of cryptographic calculations.

By changing the key generation inputs, the SoC 114 can derive unique key outputs for each CAS and DRM security provider used for a given content provider or broadcaster. CAS unique inputs such as their assigned CAS ID maybe used to differentiate derived keys for CAS1 versus CAS2. The term security provider in this context is to be broadly construed and reflects the entity who would use the derived key database for a population of fielded CE devices to protect content for purchase by an entity who had a particular CE device in their home. These security provider unique key generation outputs enable support for multiple security providers for fielded CE devices typically found in Set Top Boxes, televisions (TVs), Smart TVs and mobile devices. The black box security provider provides compatible headend applications to each content provider, so that the media programs are encrypted or otherwise protected using the CAS and DRM implementation used.

Another advantage of using a derived key database is that the black box programmed OTP key secrets programmed into the SoC 114 OTP do not have to be released to the multiple CAS and DRM security providers, since these security providers would use the derived key databases for their content protection systems. This means that if a derived key database were compromised, it only affects the specific CAS/DRM security provider that was using that specific derived key database, i.e. such compromise would not affect the fielded CE devices or derived key databases of any other such CAS/DRM security provider.

The keys and programming infrastructure summarized herein as provided by an independent black box security provider enables fielded CE devices to add additional revenue baring applications to the CE device manufacturer or content provider giving these entities more flexibility in managing their business and offering new services. Besides switching out a CAS/DRM vendor 108B for any number of reasons, enabling the ability to add applications supporting new CAS/DRM vendors 108B in fielded CE devices 112 can result in generating significantly higher content sale revenues without requiring consumers to upgrade their CE devices 112. Consumer savings are realized by extending the field life of the CE device 112 by allowing the consumer to download new software images to enable the purchase of new content services without having to replace their fielded CE devices 112.

Integrated CAS Client as a Second and/or Dormant Backup

In many cases it is desirable to fully integrate an additional CAS client in a client device 112 such as a STB to act as a second and/or dormant backup to be used in emergency situations for business continuity purposes or as an alternative to other CAS clients that may also reside in the client device.

The operator or broadcaster must assign their content packages and products to the dormant CAS so that package definitions and entitlements can be properly assigned and allow authorization messages to be created and delivered to the STBs. Client licensing and headend 102 equipment must also be available to integrate all CAS client applications implemented in the client device 112, i.e. the primary, backup and/or dormant CAS client must be fully developed, tested and ready to integrate into the client device and middleware application so that they can be fully operational in the event they are needed to replace the primary CAS client in the deployed client device. Implementing this embodiment requires the completion of the following.

First, each CAS client must be fully integrated with the client device 112 to provide full capabilities for the second/dormant CAS system. This is to assure compatibility of the CAS system and the middleware executed by the client device. Hence, if the CAS and middleware executed by the client device 112 are from different vendors, they must assure such interoperability is maintained so that the CAS and middleware operate in an integrated manner. Such integration requires marginal additional effort for a single vendor since the CAS integration effort will be conducted for each integrated CAS client.

Second, related CAS (and middleware)-related applications executing at the headend 102 must be integrated with the CAS clients and middleware executing in the client devices 112, preferably prior or near system launch. Typically, the CAS-related headend 102 execute on servers operated by the headend 102, due to intellectual property concerns and to isolate their execution environments.

Third, a CAS switch by a limited number of fielded client devices 112 should be tested to ensure proper client device 112 operation before and after the switch.

The switch to a supported CAS client in the client device 112 may be activated using the above CAS switching protocol with no hardware modifications to the client device 112 or the headend 102 equipment. This same switching protocol can be used to switch between the any of the supported CAS clients in the fielded client devices 112, giving full access to the content protection systems for the new CAS client. Using this approach such CAS switching is transparent to the CAS application running in the client device.

Exemplary Computer System

Figure 13:
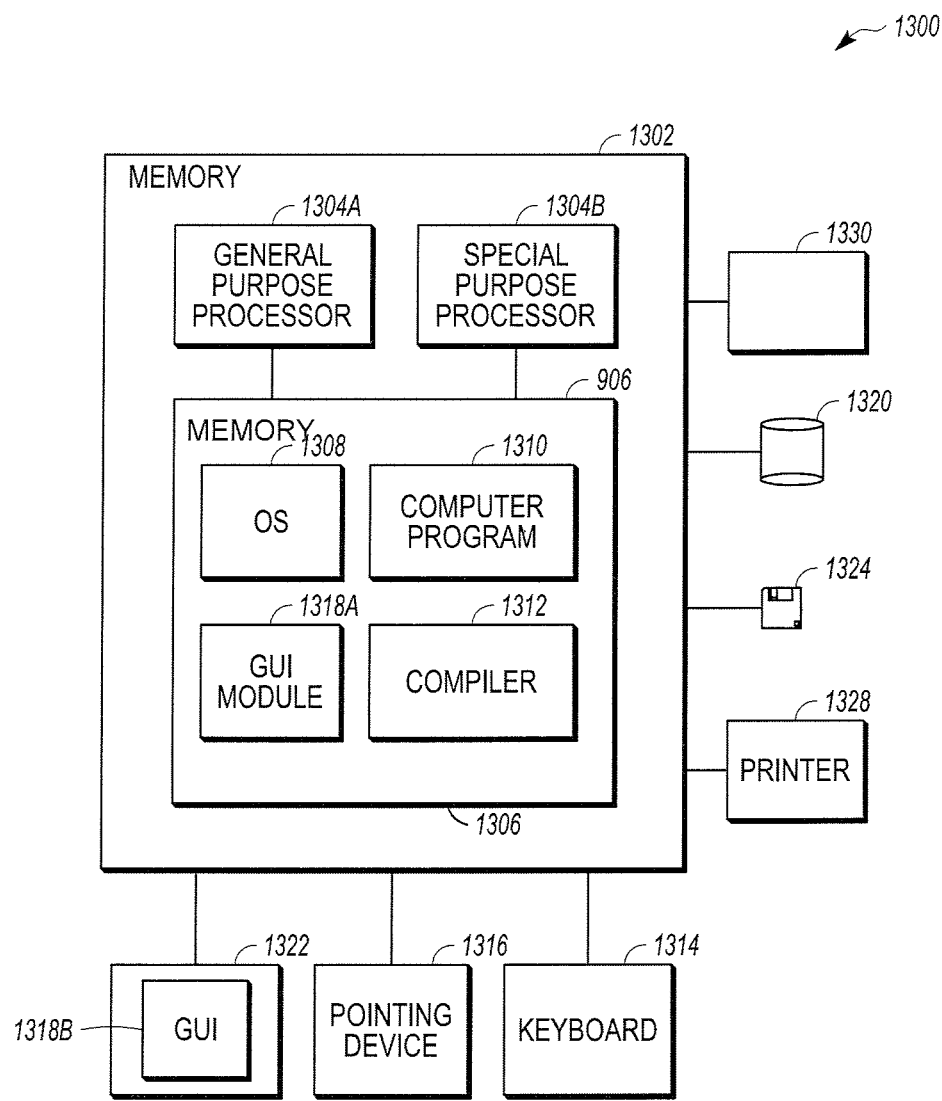
FIG. 13 illustrates an exemplary computer system that could be used to implement the present invention.

FIG. 13 is a diagram illustrating an exemplary computer system 1300 that could be used to implement elements of the present invention, including processing elements at the service provider 102, chip manufacturer 104, security provider 106, black box 116, chip manufacturer 104 and CA vendor 108B, chips 114 and CE device 112.

The computer 1302 comprises a general purpose hardware processor 1304A and/or a special purpose hardware processor 1304B (hereinafter alternatively collectively referred to as processor 1304) and a memory 1306, such as random access memory (RAM). The computer 1302 may be coupled to other devices, including input/output (I/O) devices such as a keyboard 1314, a mouse device 1316 and a printer 1328.

In one embodiment, the computer 1302 operates by the general-purpose processor 1304A performing instructions defined by the computer program 1310 under control of an operating system 1308. The computer program 1310 and/or the operating system 1308 may be stored in the memory 1306 and may interface with the user and/or other devices to accept input and commands and, based on such input and commands and the instructions defined by the computer program 1310 and operating system 1308 to provide output and results.

Output/results may be presented on the display 1322 or provided to another device for presentation or further processing or action. In one embodiment, the display 1322 comprises a liquid crystal display (LCD) having a plurality of separately addressable pixels formed by liquid crystals. Each pixel of the display 1322 changes to an opaque or translucent state to form a part of the image on the display in response to the data or information generated by the processor 1304 from the application of the instructions of the computer program 1310 and/or operating system 1308 to the input and commands. Other display 1322 types also include picture elements that change state in order to create the image presented on the display 1322. The image may be provided through a graphical user interface (GUI) module 1318A. Although the GUI module 1318A is depicted as a separate module, the instructions performing the GUI functions can be resident or distributed in the operating system 1308, the computer program 1310, or implemented with special purpose memory and processors.

Some or all of the operations performed by the computer 1302 according to the computer program 1310 instructions may be implemented in a special purpose processor 1304B. In this embodiment, some or all of the computer program 1310 instructions may be implemented via firmware instructions stored in a read only memory (ROM), a programmable read only memory (PROM) or flash memory within the special purpose processor 1304B or in memory 1306. The special purpose processor 1304B may also be hardwired through circuit design to perform some or all of the operations to implement the present invention. Further, the special purpose processor 1304B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1302 may also implement a compiler 1312 which allows an application program 1310 written in a programming language such as COBOL, C++, FORTRAN, or other language to be translated into processor 1304 readable code. After completion, the application or computer program 1310 accesses and manipulates data accepted from I/O devices and stored in the memory 1306 of the computer 1302 using the relationships and logic that was generated using the compiler 1312.

The computer 1302 also optionally comprises an external communication device such as a modem, satellite link, Ethernet card, or other device for accepting input from and providing output to other computers.

In one embodiment, instructions implementing the operating system 1308, the computer program 1310, and/or the compiler 1312 are tangibly embodied in a computer-readable medium, e.g., data storage device 1320, which could include one or more fixed or removable data storage devices, such as a zip drive, floppy disc drive 1324, hard drive, CD-ROM drive, tape drive, or a flash drive. Further, the operating system 1308 and the computer program 1310 are comprised of computer program instructions which, when accessed, read and executed by the computer 1302, causes the computer 1302 to perform the steps necessary to implement and/or use the present invention or to load the program of instructions into a memory, thus creating a special purpose data structure causing the computer to operate as a specially programmed computer executing the method steps described herein. Computer program 1310 and/or operating instructions may also be tangibly embodied in memory 1306 and/or data communications devices 1330, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1302.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. In a system of a plurality of client devices for receiving media programs from a service provider, each of the client devices having a securely executing conditional access system (CAS) client and a middleware module communicating with the CAS client, a method of controlling a group of the client devices to switch at least one client device of the group of the client devices from a first conditional access system to a second conditional access system via a plurality of client device signaling messages, the method comprising:
    generating a group identifier identifying the group of the client devices;
    transmitting a first client device signaling message having the group identifier only to each client device of the identified group of the client devices, the first client device signaling message signaling an action to assign the client device receiving the message to the identified group of the client devices, the group identifier for storage in each client device of the identified group of the client devices in non-volatile memory; and
    transmitting a second client device signaling message to the plurality of client devices, the second client device signaling message comprising the group identifier and signaling each client device having the group identifier stored in the non-volatile memory to switch from the first conditional access system to the second conditional access system;
    wherein the first client device signaling message and the second device signaling message are transmitted on a conditional access switching message channel monitored by the middleware module of each of the plurality of client devices, the conditional access switching message channel identified by an identifier transmitted to each of the plurality of client devices as application specific data.

2. The method of claim 1, wherein:
    the first client device signaling message comprises:
        a first action code of a plurality of action codes and payload data;
            the first action code signaling the action to assign the client device receiving the message to the identified group of the client devices; and
            the payload data including the group identifier of the identified group of the client devices;
    the second client device signaling message comprises:
        a second action code of the plurality of action codes and second payload data;
            the second action code signaling each client device having the group identifier stored in the non-volatile memory to switch from the first conditional access system to the second conditional access system; and
            the second payload data identifies the second conditional access system.

3. The method of claim 2, wherein the second client device signaling message comprises a time at which the switch to the second conditional access system is to be made by the client device.

4. The method of claim 2, wherein the first client device signaling message and the second client device signaling message are transmitted as private data of the digital video broadcasting (DVB) standard.

5. The method of claim 4, wherein:
the method further comprises transmitting the an identifier of the conditional access switching message channel to the plurality of client devices in a conditional access table (CAT).

6. The method of claim 5, wherein the plurality of action codes further comprises:
a first action code addressing all of the client devices; and
a second action code addressing only single client devices.

7. The method of claim 6, further comprising:
monitoring, by the middleware module of at least one of the identified group of the client devices, the channel identified by the identifier of the conditional access switching message channel;
receiving, in the middleware module of the at least one of the identified group of the client devices, the first client device signaling message; and
storing the group identifier in non-volatile storage of the at least one of the identified group of the client devices.

8. The method of claim 7, further comprising:
receiving, in the middleware module of the at least one of the identified group of the client devices, the second client device signaling message;
determining if the second client device signaling message comprises the group identifier; and
if the second client device signaling message comprises the group identifier, switching the at least one client device to the second conditional access system.

9. The method of claim 8, wherein the first client device signaling message and the second client device signaling message each further comprise:
a sequence number action code and associated sequence number; and
a timestamp action code and associated timestamp;
wherein the group identifier is stored in non-volatile memory only if the a sequence number of the sequence number action code is compares favorably with a sequence number of a sequence number action code of a third client device signaling message is numerically previous to the first client device signaling message; and
the at least one of the identified group of the client devices is switched to the second conditional access system only if the timestamp of the associated timestamp action code is temporally ahead of a current system time.

10. The method of claim 9, further comprising:
initializing the second conditional access system;
providing security data to the second conditional access system to derive keys for decrypting at least one of the media programs;
determining a management message channel identifier (EMM PID) from the conditional access table (CAT);
receiving a management message (EMM) on the management message channel identified by the management message channel identifier (EMM PID);
receiving a program map table (PMT) associated with the at least one of the media programs;
determining a control message channel identifier (ECM PID) corresponding to the second conditional access system from the program map table (PMT);
receiving control messages on a control message channel identified by the control message channel identifier; and
decrypting the at least one of the media programs using the second conditional access system according to the derived keys and the control message.

11. In a system of a plurality of client devices for receiving media programs from a service provider, each of the client devices having a securely executing conditional access system (CAS) client and a middleware module communicating with the CAS client, an apparatus for controlling a group of the plurality of client devices to switch at least one client device of the group of the client devices from a first conditional access system to a second conditional access system via a plurality of client device signaling messages, each of the client devices for receiving media programs from a service provider, comprising:
a private data generator, comprising:
a processor;
a memory, the memory storing processor instructions comprising instructions for:
generating a group identifier identifying the group of the client devices;
a transmitter, communicatively coupled to the private data generator, the transmitter for:
transmitting a first client device signaling message having the group identifier only to each client device of the identified group of the client devices, the first client device signaling message signaling an action to assign the client device receiving the message to the identified group of the client devices, the group identifier for storage in each client device of the group of the client devices in non-volatile memory; and
transmitting a second client device signaling message to the plurality of client devices, the second client device signaling message comprising the group identifier and signaling each client device having the group identifier stored in the non-volatile memory to switch from the first conditional access system to the second conditional access system;
wherein the first client device signaling message and the second device signaling message are transmitted on a conditional access switching message channel monitored by the middleware module of each of the plurality of client devices, the conditional access switching message channel identified by an identifier transmitted to each of the plurality of client devices as application specific data.

12. The apparatus of claim 11, wherein:
the first client device signaling message comprises:
a first action code of a plurality of action codes and payload data;
the first action code signaling the action to assign the client device receiving the message to the group of the client devices; and
the payload data including the group identifier of the group of the client devices;
the second client device signaling message comprises:
a second action code of the plurality of action codes and second payload data;
the second action code signaling each client device having the group identifier stored in the non-volatile memory to switch from the first conditional access system to the second conditional access system; and
the second payload data identifies the second conditional access system.

13. The apparatus of claim 12, wherein the second client device signaling message comprises a time at which the switch to the second conditional access system is to be made by the client device.

14. The apparatus of claim 12, wherein the first client device signaling message and the second client device signaling message are transmitted as private data of the digital video broadcasting (DVB) standard.

15. The apparatus of claim 14, wherein:
each of the plurality of client devices comprises:
a client device processor;
a client device memory, storing client device processor instructions implementing a middleware module, the instructions including instructions for:
monitoring a conditional access switching message channel for the first client device message and the second client device messages; and
the transmitter further transmits the identifier of the conditional access switching message channel (switching message PID) to the plurality of client devices in a conditional access table (CAT).

16. The apparatus of claim 15, wherein the plurality of action codes further comprises:
a first action code addressing all of the client devices; and
a second action code addressing only single client devices.

17. The apparatus of claim 16, wherein:
the client device processor instructions implementing the middleware module further comprise instructions for:
monitoring the channel identified by the identifier of the conditional access switching message channel;
receiving the first client device signaling message; and
the client device processor instructions further comprise instructions for storing the group identifier in non-volatile storage of the at least one of the group of the client devices.

18. The apparatus of claim 17, wherein:
the client device processor instructions implementing the middleware module further comprise instructions for:
receiving, the second client device signaling message;
determining if the second client device signaling message comprises the group identifier; and
the client device processor instructions further comprise instructions for switching the at least one client device to the second conditional access system if the second client device signaling message comprises the group identifier.

19. The apparatus of claim 18, wherein the first client device signaling message and the second client device signaling message each further comprise:
a sequence number action code and associated sequence number; and
a timestamp action code and associated timestamp;
wherein the group identifier is stored in non-volatile memory only if the a sequence number of the sequence number action code is compares favorably with a sequence number of a sequence number action code of a third client device signaling message is numerically previous to the first client device signaling message; and
the at least one of the group of the client devices is switched to the second conditional access system only if the timestamp of the associated timestamp action code is temporally ahead of a current system time.

20. The apparatus of claim 19, wherein:
the client device processor instructions implementing the middleware module further comprise instructions for:
initializing the second conditional access system;
providing security data to the second conditional access system to derive keys for decrypting at least one of the media programs;
receiving a management message channel identifier (EMM PID) determined by a CAS client from the received conditional access table (CAT);
receiving a management message (EMM) on the management message channel identified by the management message channel identifier (EMM PID);
receiving a program map table (PMT) associated with the at least one of the media programs;
determining a control message channel identifier (ECM PID) corresponding to the second conditional access system from the program map table (PMT); and
receiving control messages on a control message channel identified by the control message channel identifier;
the client device further comprises a security processor communicatively coupled to a security processor memory, the security processor memory comprising security processor instructions for:
decrypting the at least one of the media programs using the second conditional access system according to the derived keys and the control message.

21. In a system of a plurality of client devices for receiving media programs from a service provider, each of the client devices having a securely executing conditional access system (CAS) client and a middleware module communicating with the CAS client, an apparatus for controlling a group of the plurality of client devices to switch from a first conditional access system to a second conditional access system via a plurality of client device signaling messages, each of the client devices for receiving media programs from a service provider, comprising:
a private data generator, comprising:
a processor;
a memory, the memory storing processor instructions comprising instructions for:
generating a group identifier identifying the group of the client devices;
a transmitter, communicatively coupled to the private data generator, the transmitter for:
transmitting a first client device signaling message having the group identifier only to each client device of the identified group of the client devices, the first client device signaling messages signaling an action to assign the client device receiving the message to the identified group of the client devices, the group identifier for storage in each client device of the group of the client devices in non-volatile memory; and
transmitting a second client device signaling message to plurality of client devices, the second client device signaling message comprising the group identifier and signaling each of the group of client device having the group identifier stored in the non-volatile memory to switch from the first conditional access system to the second conditional access system
wherein:
the first client device signaling message and the second device signaling message are transmitted on a conditional access switching message channel monitored by the middleware module of each of the plurality of client devices, the conditional access switching message channel identified by an identifier transmitted to each of the plurality of client devices as application specific data each of the plurality of client devices comprises:
  a client device processor;
  a client device memory, storing client device processor instructions implementing the middleware module, the instructions including instructions for monitoring the conditional access switching message channel for the first client device signaling message and the second client device switching message; and the transmitter further transmits the an identifier of the conditional access switching message channel to the plurality of client devices as application specific data.

\* \* \* \* \*